(12) United States Patent
Nabeshima et al.

(10) Patent No.: US 8,033,614 B2
(45) Date of Patent: Oct. 11, 2011

(54) TRANSPORTER VEHICLE

(75) Inventors: Yoshifumi Nabeshima, Tsuchiura (JP);
Takashi Yagyu, Ushiku (JP); Takashi Sasaki, Kasumigaura (JP); Toshikazu Minoshima, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 236 days.

(21) Appl. No.: 12/513,791

(22) PCT Filed: Jan. 28, 2008

(86) PCT No.: PCT/JP2008/051694
§ 371 (c)(1),
(2), (4) Date: Jul. 6, 2009

(87) PCT Pub. No.: WO2008/099691
PCT Pub. Date: Aug. 21, 2008

(65) Prior Publication Data
US 2010/0026079 A1 Feb. 4, 2010

(30) Foreign Application Priority Data
Feb. 16, 2007 (JP) ................... 2007-036587

(51) Int. Cl.
*B60P 1/16* (2006.01)
(52) U.S. Cl. .................... 298/22 C; 298/20 R

(58) Field of Classification Search ............... 298/17 R, 298/19 R, 20 R, 22 R, 22 C, 17 S; 701/50; 280/6.151; 180/271, 272, 290
See application file for complete search history.

(56) References Cited

U.S. PATENT DOCUMENTS
2008/0272641 A1* 11/2008 Godwin et al. ............. 298/22 R

FOREIGN PATENT DOCUMENTS

| JP | 11-123973 A | 5/1999 |
|---|---|---|
| JP | 2001-71956 A | 3/2001 |
| JP | 2001-105954 A | 4/2001 |
| JP | 2001-105955 A | 4/2001 |
| JP | 2006-52810 A | 2/2006 |

* cited by examiner

*Primary Examiner* — Stephen Gordon
(74) *Attorney, Agent, or Firm* — Mattingly & Malur, PC

(57) ABSTRACT

Detection signals from lever sensor (29), sit-down sensor (30) and vehicle speed sensor (31) are read into a controller (32). A control signal is produced by the controller (32) to switch a directional control valve (20) of a control valve unit (16) instantly from a floating position (c) to a neutral position (a) and to switch another directional control valve (21) from a neutral position (a) to a lowering position (d) when a dump truck (1) is in travel with the directional control valve (20) of the control valve unit (16) is switched in the floating position (c). Whereupon, a hoist cylinder (10) is contracted by a hydraulic pressure force to hold a vessel (3) in a sit-down position on a vehicle body (2), thereby preventing the vessel (3) from shaking movements like floating up while the dump truck (1) is in travel.

15 Claims, 12 Drawing Sheets

TRANSPORTER VEHICLE

TECHNICAL FIELD

The present invention relates to a transporter vehicle such as a dump truck which is suitably used in transporting crushed stones excavated from such as an open-pit stone, a stone quarry, a mine, or dug earth and sand or the like.

BACKGROUND ART

In general, a large-size transporter vehicle called a dump truck has a liftable vessel (loading platform) on a frame of a vehicle body, and carries and transports objects to be transported such as crushed stones or earth and sand or the like to an unloading site or a cargo collection site of, for instance, an exit port close to a coast in a state in which the objects to be transported are loaded in a large quantity on the vessel (e.g., see Japanese Patent Laid-Open No. 2001-105954).

A transporter vehicle of this type according to the prior art is comprised of a vehicle body capable of self traveling; a loading platform which is provided on the vehicle body in such a manner as to be capable of being tilted (lifted) and on which the objects to be transported are loaded; a hoist cylinder which is telescopically provided between the loading platform and the vehicle body and extended at the time of discharging the objects to be transported from the loading platform so as to tilt the loading platform diagonally backward with respect to the vehicle body; a hydraulic pressure source for supplying pressure oil; and 4 positional directional control valve units which are provided between the hoist cylinder and hydraulic pressure source to extend or contract the hoist cylinder switched by a control lever.

Further, the control valve unit used in such a transporter vehicle has a total of 4 changeover positions including a raising position for raising the loading platform by extending the hoist cylinder by supplying and discharging the pressure oil from the hydraulic pressure source in one direction; a lowering position for lowering the loading platform downward by contracting the hoist cylinder by supplying and discharging the pressure oil in the other direction; a floating position for allowing the self-weight fall of the loading platform by contracting the hoist cylinder by the self-weight of the loading platform side; and a neutral position for stopping the movement of the hoist cylinder by stopping the supply and discharge of the pressure oil.

The directional control valve is selectively switched to and from either one of the above-mentioned 4 positions by way of a manual control lever. Further, after the transporter vehicle traveled by itself to the cargo collection site in the state in which the earth and sand or crushed stones or the like are loaded on the loading platform, the hoist cylinder is extended to rise the loading platform diagonally backward. Through this raising operation, the earth and sand or crushed stones or the like are discharged to the cargo collection site along the tilting direction of the loading platform.

Namely, when the directional control valve is switched to a raising position from a neutral position in which the loading platform is kept at rest, pressure oil from a hydraulic pressure source is fed toward hoist cylinders, and as a result the hoist cylinders are expanded to lift up the loading platform to largely tilted position in a rearward direction against the vehicle body to slide and dump transported loads off the loading platform.

On the other hand, after dumping loads (after unloading the loading platform), the directional control valve is manually switched either to a lowering position or to a floating position from the raising position to turn the loading platform downward. In case the directional control valve is switched to a floating position, the hoist cylinders are contracted under the self-weight fall of the loading platform itself, and as a result the loading platform is gradually lowered by self-weight fall until it sits down on the vehicle body.

In the case of the transporter vehicle in the prior art as mentioned above, when a directional control valve is switched to a lowering position to turn a loading platform from a rearwardly tilted position to a flat sit-down position on a vehicle body, pressure oil from a hydraulic pressure source is supplied in a direction of lowering hoist cylinders, forcibly contract the hoist cylinders with the pressure oil of the hoist cylinders. However, in case hoist cylinders are forcibly contracted in this manner, the loading platform can be collided against the vehicle body by application of a superfluous load at the instant when it is turned toward to a flat sit-down position on the vehicle body.

Further, if the directional control valve is kept in the lowering position, the loading platform is continually pressed against the vehicle body, hydraulic pressure force from the hoist cylinders can be constantly applied on abutting surfaces of the loading platform and vehicle body as superfluous loads. In addition, a pressure of the pressure oil keeps acting on the hoist cylinders as superfluous load, causes to shorten the life spans of the hoist cylinders.

For this reason, the transporter vehicle of the prior art is arranged to switch the directional control valve to the floating position instead of the lowering position, letting the loading platform sit down (lie down) on the vehicle body by its own weight and automatically keeping the hoist cylinders in a contracted state through utilization of the self-weight of the loading platform when the vehicle is in travel.

However, in many cases, transporter vehicles like dump trucks which are in travel to and from a pulverizing plant of a mine or the like, for example, are shaken up and down on a bumpy road when it is in travel. More particularly, in such a case a transporter vehicle is put in horizontal (lateral) shaking movements due to torsional deformations of the vehicle body, in addition to vertical shaking movements caused by an upthrust of a road surface.

If a directional control valve is left in a floating position on such an occasion, hoist cylinders which are held in a contracted state by the self-weight of a loading platform are put under the influences of vertical and horizontal (lateral) shaking movements. That is to say, hoist cylinders are repeatedly expanded and contracted over small stroke lengths.

As a consequence, a loading platform sitting down on a vehicle body start to shake in vertical direction and at the same time put in lateral deviational movements in such a way as to encourage vibrational movements of the loading platform all the more, when the vehicle is in travel. Naturally, this gives a considerable discomfort to an operator in a cab of the vehicle. In addition, the repeated jumping motions of a loading platform on a vehicle body will give adverse effects on nearby component parts, particularly, on their durability and on their life span as well.

DISCLOSURE OF THE INVENTION

In view of the above-discussed problems with the prior art, it is an object of the present invention to provide a transporter vehicle which is capable of suppressing shaky jumping motions of a loading platform on a vehicle body when the vehicle is in travel, for relieving discomfort on the part of an operator while ensuring higher durability and longer service life of the device.

(1) In order to achieve the above-stated objective, according to the present invention, there is provided a transporter vehicle, comprised of: an automotive vehicle body, a loading platform tiltably mounted on the vehicle body to carry a load of transportation, an expandable hoist cylinder connected between the loading platform and the vehicle body to lift the loading platform up to a rearwardly tilted position at the time of dumping the load of transportation from the loading platform, a hydraulic pressure source for supplying and discharging pressure oil to and from the hoist cylinder to elongate and contract the hoist cylinder, and a control valve unit connected between the hydraulic pressure source and the hoist cylinder to control supply and discharge of pressure oil to and from the hoist cylinder; the control valve unit being switchable to and from a plural number of positions, including a raising position for raising the loading platform by extending the hoist cylinder by supplying and discharging the pressure oil, a lowering position for lowering the loading platform downward by contracting the hoist cylinder by supplying and discharging the pressure oil, a floating position for allowing a self-weight fall of the loading platform by contracting the hoist cylinder by the self-weight of the loading platform, and a neutral position for stopping the movement of the hoist cylinder by stopping the supply and discharge of the pressure oil.

The transporter vehicle according to the present invention is characterized in that: a position detecting means adapted to detect which one of the plural positions the control valve unit is currently shifted; a platform condition detecting means adapted to detect a current posture of the loading platform on the vehicle body; a vehicle speed detecting means adapted to detect whether or not the vehicle body is current in travel; and a control means adapted to switch the control valve unit from the floating position to the lowering position when it is judged that the control valve unit is currently in the floating position, that the loading platform floated up from the vehicle body and that the vehicle body is currently in travel, on the basis of detection signals from the position detecting means, a platform condition detecting means and a vehicle speed detecting means.

With the arrangements just described, in case the loading platform is floated upward of the vehicle body while the vehicle is in travel with the control valve unit in the floating position, the control valve unit is instantly switched from the floating position to the lowering position by the control means to hold the hoist cylinder in a contracted state by means of a hydraulic pressure force. Thus, the loading platform can be maintained in a sit-down position against the vehicle body and restrained of shaky or jumping movements of the loading platform on the vehicle body.

Thus, the loading platform which should be kept in a sit-down position on the vehicle body while the vehicle is in travel is prevented by the hoist cylinder from going into jumping movements in the vertical direction or into lateral deviational shaky movements to relieve the discomfort which is felt on the part of an operator in the cab of the vehicle. The suppression of jumping motions of the loading platform on the vehicle body leads to protection of nearby component parts from vibrational damages, guaranteeing higher durability and a longer service life for them, in addition to enhancement of reliability of the transporter vehicle itself.

(2) Further, according to the present invention, the transporter vehicle further comprising a weight detecting means adapted to detect a current loadage of the vehicle body; the control means being adapted to switch the control valve unit from the floating position to the lowering position when it is judged that the control valve unit is currently in the floating position, that the loading platform is floated up from the vehicle body, that the vehicle body is currently in travel and that a current loadage is smaller than a predetermined reference value, on the basis of a detection signal from the weight detecting means in addition to detection signals from the position detecting means, the platform condition detecting means, and the vehicle speed detecting means.

In this case, the control valve unit is switched from the floating position to the lowering position when it is judged that the vehicle body is in travel with the control valve unit in the floating position, that the loading platform is floated up from the vehicle body and that a current loadage of the loading platform is smaller than a predetermined reference value. Therefore, when the vehicle is put in travel carrying substantially no load of transportation like crushed stones in the loading platform, the control valve unit is switched from the floating position to the lowering position to suppress floating or jumping motions of the loading platform on the vehicle body. In case the loading platform is loaded with a substantial amount of transportation material which is heavy enough for suppressing jumping motions of the loading platform floating up from the vehicle body, the control valve unit is left in the floating position even the vehicle is in travel, precluding possibilities of hydraulic pressure forces acting on the hoist cylinder as extra loads.

(3) According to the present invention, the transporter vehicle further comprising suspensions between the vehicle body and vehicle wheels; and the weight detecting means being constituted by pressure sensors adapted to detect variations in inner pressure of the suspensions.

In this case, since a current loadage of the vehicle can be detected from a detection signal which are detected by monitoring variations in inner pressure of suspensions which support between the vehicle body and traveling wheels, with a pressure sensor, a current loadage can be easily detected by using suspensions which exist on most of transporter vehicles of this sort, coupled with an advantage that the pressure sensors can be attached to the suspensions very easily.

(4) On the other hand, according to the present invention, the platform condition detecting means is constituted by a sit-down sensor adapted to detect whether or not the loading platform is sitting down on the vehicle body.

Thus, current conditions of the loading platform are checked out by means of the sit-down sensor which is adapted to detect whether or not the loading platform is sitting down on the vehicle body. Therefore, whether or not the loading platform is sitting down on the vehicle body or floating up a distance away from the vehicle body can be checked out with high accuracy by means of the sit-down sensor.

(5) Further, according to the present invention, the platform condition detecting means is constituted by an angle sensor adapted to detect a tilt angle of the loading platform relative to the vehicle body.

Thus, in this case conditions of the loading platform is checked out by an angle sensor by detecting a tilt angle of the loading platform relative to the vehicle body, it is possible to detect a float-up condition of the loading platform with high accuracy by making a judgment as to whether or not a current tilt angle of the loading platform against the vehicle body exceeds a predetermined reference value. Depending upon the type of the vehicle, an existing angle sensor can be utilized for this purpose.

(6) Further, according to the present invention, the control valve unit is composed of a combination of a first directional control valve switchable to either a neutral position for suspending supply and discharge of pressure oil to and from the hoist cylinder or to either one of the raising position and floating position, and a second directional control valve switchable to a neutral position for suspending supply and discharge of pressure oil to and from the hoist cylinder or to either one of the raising position and lowering position.

Thus, the control valve unit, which is constituted by a combination of first and second directional control valves, can be realized by the use of a couple of 3-position directional control valves which are in general use, without using a 4-position directional control valve which is complicate in construction. When both of the first and second directional control valves of the control valve unit are in neutral positions, respectively, movement of the hoist cylinder is stopped to retain the loading platform in a current position. Further, when both of the first and second directional control valves are switched to the raising positions from the neutral position respectively, the hoist cylinder is expanded to lift up the loading platform to a raising position. On the other hand, when the first directional control valve is switched to the floating position with the second directional control valve in the neutral position, the hoist cylinder can be contracted under the self-weight fall of the loading platform. Further, when the first directional control valve is returned to the neutral position with the second directional control valve switched to the lowering position, the hoist cylinder can be forcibly contracted by a pressure of the pressure oil.

(7) Further, according to the present invention, the control valve unit is composed of first and second directional control valves connected in parallel between the hydraulic pressure source and the hoist cylinder, the first directional control valve being switchable to a neutral position for suspending supply and discharge of pressure oil to and from the hoist cylinder or to either one of the raising position and floating position, and the second directional control valve being switchable to a neutral position for suspending supply and discharge of pressure oil to and from the hoist cylinder or either one of the raising position and lowering position.

Thus, according to the present invention, the control valve unit can be built of a couple of first and second directional control valves which are connected in parallel between the hydraulic pressure source and the hoist cylinder, namely, by the use of a couple of conventional 3-position directional control valves which are in general use.

DESCRIPTION OF REFERENCE NUMERALS

Figure 1:
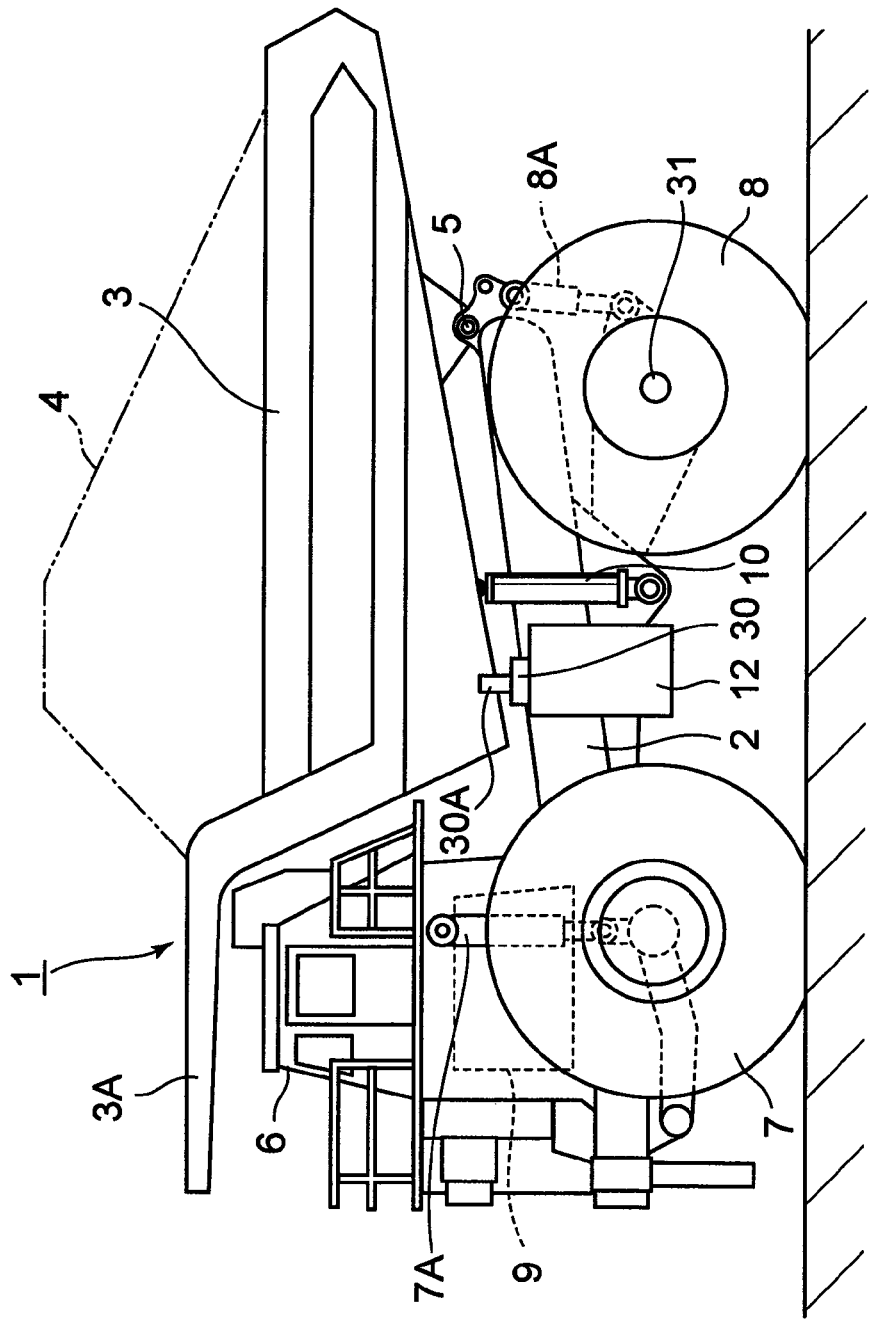
FIG. 1 is a front view illustrating a dump truck according to a first embodiment of the present invention.

1: Dump truck (transporter vehicle)
2: Vehicle body
3: Vessel (loading platform)
4: Crushed stones (object of transportation)
5: Connecting pin
6: Cab
7: Front wheel
7A: Front wheel side suspension
8: Rear wheel
8A: Rear wheel side suspension
9: Engine
10: Hoist cylinder
11: Hydraulic pump (hydraulic pressure source)
12: Hydraulic oil tank (hydraulic pressure source)
16: Control valve unit
20: First directional control valve
21: Second directional control valve
28: Manual control lever assembly
28A: Manual control lever
29: Lever sensor (position detecting means)
30: Sit-down sensor (platform condition detecting means)
31: Vehicle speed sensor (vehicle speed detecting means)
32, 42, 53: Controller (Control means)
41, 51: Angle sensor (Platform condition detecting means)
52: Pressure sensor (Weight detecting means)
(a): Neutral position
(b): Raising position
(c): Floating position
(d): Lowering position

BEST MODE FOR CARRYING OUT THE INVENTION

Hereafter, with reference to FIGS. 1 through 12, a detailed description will be given of a transporter vehicle in accordance with an embodiment of the invention by citing as an example a dump truck which transports crushed stones or other similar objects excavated from mine.

Figure 2:
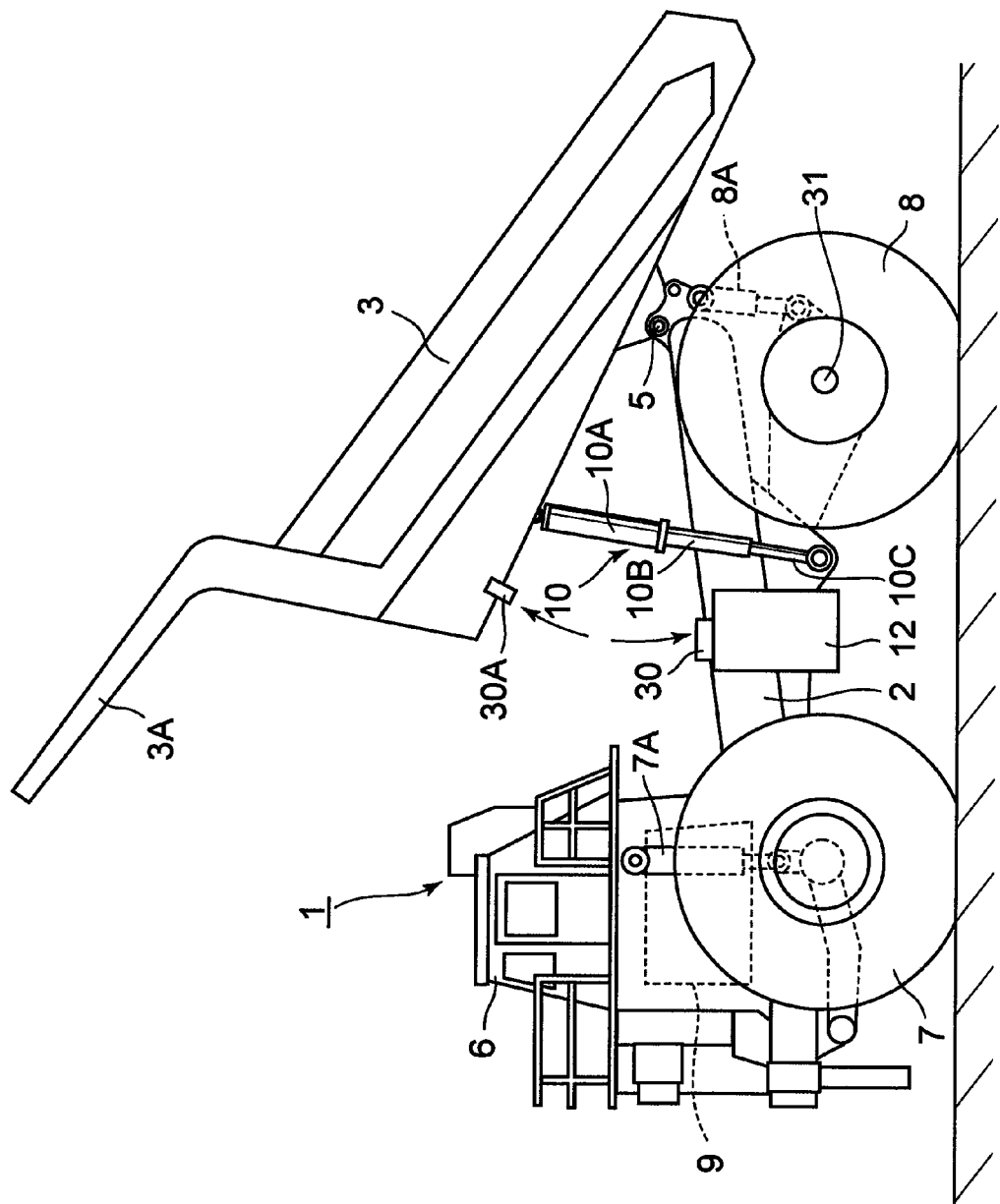
FIG. 2 is a front view illustrating a state in which a vessel of the dump truck is tilted up diagonally backward in a dumping position.

Referring first to FIGS. 1 through 5, there is shown a first embodiment of the present invention. In the drawings, denoted at 1 is a dump truck which is a large-size transporter vehicle. As shown in FIGS. 1 and 2, the dump truck 1 is largely comprised of a vehicle body 2 forming a rigid frame structure and a vessel 3 serving as a loading platform which is tiltably (liftably) mounted on the vehicle body 2.

Further, the vessel 3 is formed as a large-size container whose overall length reaches as much as 10 to 13 meters to load a large volume of heavy objects to be transported such as crushed stones or other similar objects (hereafter referred to as the crushed stones 4). Its rear side bottom portion is tiltably coupled to a rear end side of the vehicle body 2 by using a connecting pin 5. Further, protectors 3A are projected forward from a front top of the vessel 3 in such a way as to cover from upper side of a cab 6, which will be described hereinafter.

Namely, the bottom side of the vessel 3 is rotatably supported by the rear end of the vehicle body 2 by using the connecting pin 5. Further, as a below-described hoist cylinder 10 is extended or contracted, the protector 3A which is on the front end side of the vessel 3 is rotated (raised or lowered) vertically with the connecting pin 5 as a fulcrum. Consequently, the vessel 3 is rotated between a transporting position shown in FIG. 1 and a dumping position shown in FIG. 2, and the crushed stones 4 loaded in the vessel 3 are discharged at a predetermined cargo collection site from the vessel 3 which has tilted backward, as shown in FIG. 2.

Figure 4:
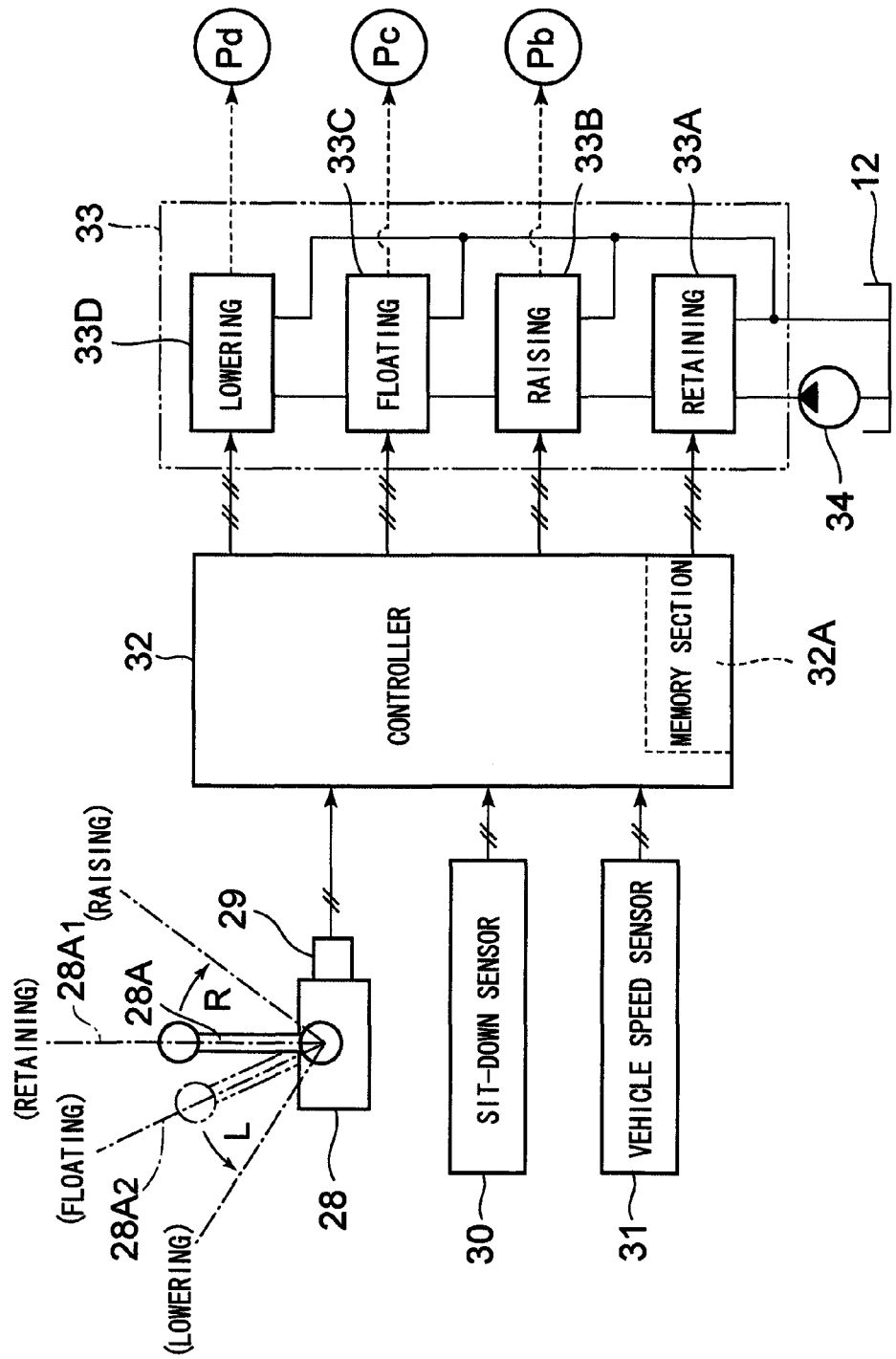
FIG. 4 is a block diagram of a control system for supplying pilot pressures to respective directional control valves in FIG. 3.

Indicated at 6 is a cab which is built on a front portion of the vehicle body 2 and positioned to the lower side of the protectors 3A. The cab 6 provides an operating room to be occupied by an operator of the dump truck 1, and internally equipped with an operator's seat, a start-up switch, an accelerator pedal, a brake pedal, and a steering handle (none of which is shown in the drawings), along with control levers 28A (one of which is shown in FIG. 4).

The protectors 3A of the vessel 3 is so arranged as to cover almost entirely the upper side of the cab 6 to protect the latter from hard flying objects like stones and rocks, and to protect an operator of the cab 6 in the event of an overturn of the vehicle (the dump truck 1).

Denoted at 7 are right and left front wheels (only one front wheel is shown in the drawings) which are rotatably supported in the front side of the vehicle body 2. These front wheels 7 are steering wheels which are steered by a steering action of an operator of the dump truck 1. Similarly to rear wheels 8 which will be described hereinafter, each one of the front wheels 7 measures 2 to 4 meters, for example, in outside tire diameter. In this instance, a front wheel side suspension 7A in the form of a hydraulic damper, for example, is interposed between the front side of the vehicle body 2 and each front wheel 7 thereby to support the front side of the vehicle body 2 on the front wheels 7.

Indicated at 8 are left and right rear wheels (only one is shown) which are provided rotatably on the rear side of the vehicle body 2, and the rear wheels 8 constitute drive wheels of the dump truck 1 which are rotatively driven by a traveling drive unit (not shown). Further, a rear wheel side suspension 8A constituted by a hydraulic shock absorber or the like is provided between the rear wheel 8 and the rear portion of the vehicle body 2. This rear wheel side suspension 8A supports the rear side of the vehicle body 2 at a position between the same and the rear wheel 8.

Indicated at 9 is an engine which is mounted on the vehicle body 2 underneath the cab 6, as a prime mover of the vehicle. For example, a large Diesel engine is adopted as the engine 9 to rotationally drive a hydraulic pump 11 of FIG. 3, which will be described hereinafter.

Indicated at 10 is a pair of hoist cylinders (only one hoist cylinder is shown in FIG. 1) which are connected between the vehicle body 2 and the vessel 3 and are expansible and contractible. Each one of these hoist cylinders 10 is constituted by a multi-stage hydraulic cylinder (e.g., a two-stage cylinder), which is composed of an outer tube portion 10A positioned on the outer side as shown in FIG. 3, an inner tube portion 10B which is telescopically fitted in the outer tube portion 10A in such a way as to define an upper oil chamber A and a lower oil chamber B in the outer tube portion 10A, and a piston rod 10C which is telescopically fitted in the inner tube portion 10B.

The piston rod 10C of each hoist cylinder 10 is extended out in a downward direction when pressure oil is supplied to the oil chamber A from a hydraulic pump 11, which will be described hereinafter, turning the vessel 3 upward about the connecting pin 5 as a fulcrum to assume a sloped dumping position having the vessel 3 tilted downward in a rearward direction. On the other hand, when pressure oil is supplied to the oil chamber B from the hydraulic pump 11, the piston rod 10C is retracted into the inner tube portion 10B, turning the vessel 3 downward about the connecting pin 5 as a fulcrum to assume a horizontal transporting position (see FIG. 1) letting the vessel 3 sit down horizontally on the vehicle body 2.

The respective hoist cylinders 10 are driven by way of a hydraulic circuit which is arranged as described below with reference to FIG. 3.

Figure 3:
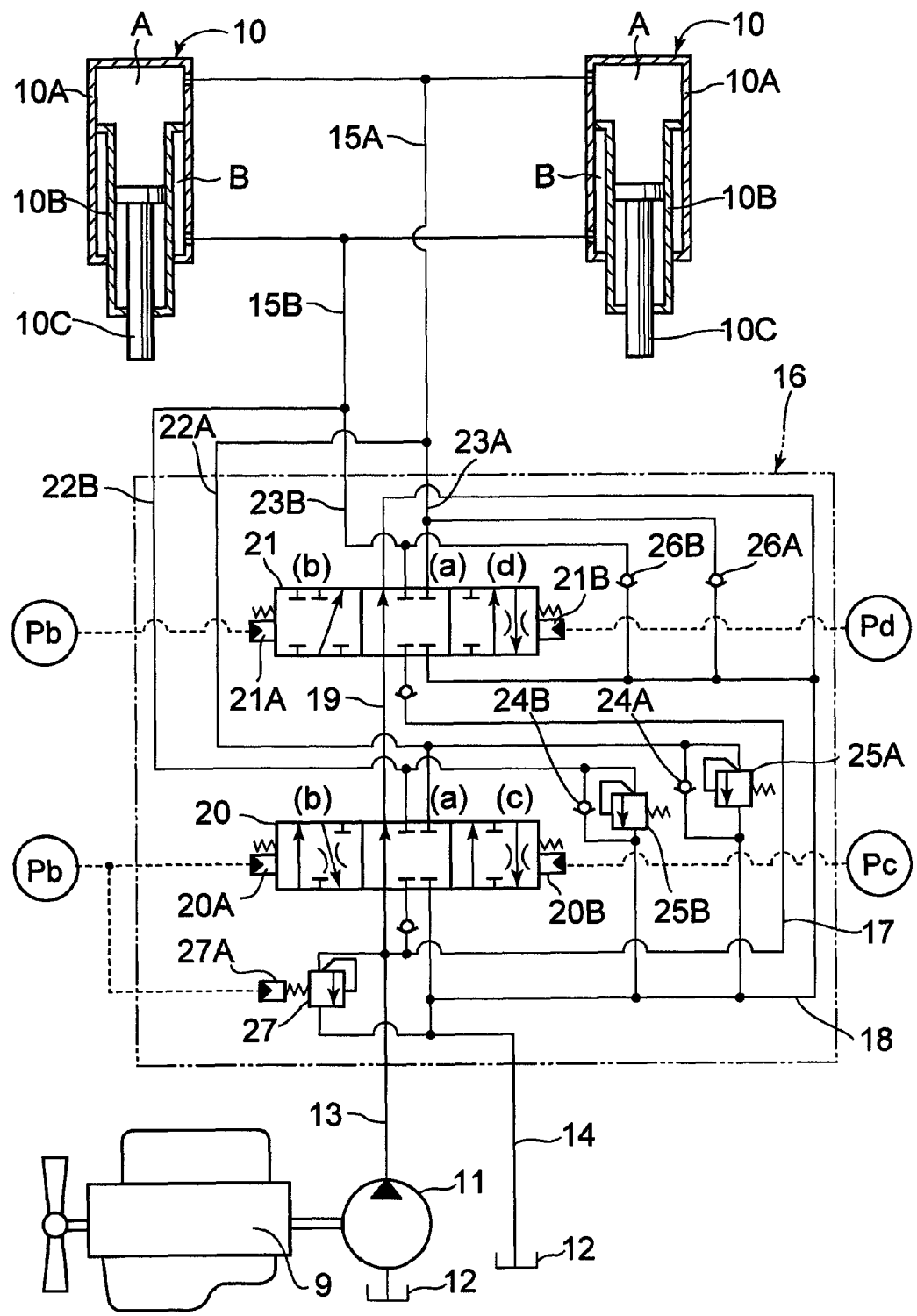
FIG. 3 is a hydraulic circuit diagram to drive a hoist cylinder.

In FIG. 3, indicated at 11 is a hydraulic pump which constitutes a hydraulic pressure source along with a hydraulic oil tank 12 (hereinafter referred to simply as "tank 12" for brevity). In this case, as shown in FIG. 1, the tank 12 is mounted on a lateral side of the vehicle body 2 at a position beneath the vessel 3.

In this instance, as the hydraulic pump 11 is rotationally driven from the engine 9, hydraulic oil which is stored in the tank 12 is taken into the hydraulic pump 11 and delivered as pressure oil to a high pressure pump line 13 on the output side of the hydraulic pump 11. Return oil from the hoist cylinders 10 is drained to the tank 12 through a low pressure tank line 14.

Designated at 15A and 15B is a pair of hydraulic conduits which are connected to the oil chambers A and B of each hoist cylinder 10, respectively. These hydraulic conduits 15A and 15B are respectively connected to a hydraulic pressure source (including the hydraulic pump 11 and tank 12) through a control valve unit 16, which will be described hereinafter, to supply pressure oil from the hydraulic pump 11 to the oil chambers A and B of the respective hoist cylinders 10 or to drain pressure oil in the oil chambers A and B to the tank 12.

Indicated at 16 is a control valve unit which is connected between the hydraulic pump 11, the tank 12 and the hoist cylinders 10. In this instance, for example, the control valve unit 16 is largely constituted by a high pressure side passage 17, a low pressure side passage 18, a bypass passage 19, a first directional control valve 20 and a second directional control valve 21. In this case, the first and second directional control valves 20 and 21 are connected in parallel relative to each other by way of the high pressure side passage 17, low pressure side passage 18 and bypass passage 19.

The high pressure side passage 17 of the control valve unit 16 is connected to output side of the hydraulic pump 11 through the pump line 13, while the low pressure side passage 18 is connected to the tank 12 through the tank line 14. Further, as shown in FIG. 3, the bypass passage 19 of the control valve unit 16 is adapted to intercommunicate the high and low pressure side passages 17 and 18, for example, when the directional control valves 20 and 21 are each in a neutral position (a), holding the hydraulic pump 11 in an unloaded condition, keeping its output pressure (the pressure in the pump line 13) at a low level akin to the tank pressure.

On the other hand, a couple of actuator side oil passages 22A and 22B are connected to the output side of the first directional control valve 20. These actuator side oil passages 22A and 22B are connected to the oil chambers A and B of the hoist cylinders 10 through hydraulic conduits 15A and 15B, respectively. On the other hand, a couple of actuator side oil passages 23A and 23B are connected to the output side of the second directional control valve 21. These actuator side oil passages 23A and 23B are connected to the oil chambers A and B of the hoist cylinders 10 through the hydraulic conduits 15A and 15B, respectively.

In this instance, for example, the directional control valves 20 and 21 of the control valve unit 16 are each constituted by a hydraulically piloted 6-port 3-position directional control valve, for example. The first directional control valve 20 is provided with a pair of hydraulic pilot portions 20A and 20B. When a pilot pressure Pb, which will be described hereinafter, is applied to the hydraulic pilot portion 20A, the first directional control valve 20 is switched from a neutral position (a) to a raising position (b). On the other hand, when a pilot pressure Pc, which will be described hereinafter, is applied to the hydraulic pilot portion 20B, the directional control valve 20 is switched from the neutral position (a) to a floating position (c).

Likewise, the second directional control valve 21 is provided with a pair of hydraulic pilot portions 21A and 21B. When a pilot pressure Pb, which will be described hereinafter, is applied to the hydraulic pilot portion 21A, the second directional control valve 21 is switched from a neutral position (a) to a raising position (b). On the other hand, when a pilot pressure Pd, which will be described hereinafter, is applied to the opposite hydraulic pilot portion 21B, the second directional control valve 21 is switched from the neutral position (a) to a lowering position (d).

Now, described below are performances of the control valve unit 16 in a retaining position. Namely, in this case, as shown in FIG. 3, each one of the first and second directional control valves 20 and 21 of the control valve unit 16 is in the neutral position (a), holding the hoist cylinders 10 motionless to retain the vessel 3 in a retaining position keeping still at a current position. Thus, in this retaining position, the directional control valves 20 and 21 of the control valve unit 16 are each in the neutral position (a), suspending supply and discharge of pressure oil to and from the hoist cylinders 10 through the actuator side oil passage 22A and 22B and the actuator side oil passage 23A and 23B.

The control valve unit 16 is changed over to a raising position in the manner as follows. In this case, both of the first and second directional control valves 20 and 21 of the control valve unit 16 are switched to a raising position (b) from the neutral position (a). In the first place, as soon as the second directional control valve 21 is switched to the raising position (b), pressure oil from the hydraulic pump 11 is supplied to the oil chambers A of the hoist cylinders 10 through the pump line 13, high pressure side passage 17, directional control valve 21, actuator side oil passage 23A and hydraulic conduit 15A. Further, as soon as the first directional control valve 20 is switched to the raising position (b), pressure oil in the oil chambers B is drained to the tank 12 through the hydraulic conduit 15B, actuator side oil passage 22B, directional control valve 20, low pressure side passage 18 and tank line 14.

As a consequence, the piston rod 10C of each hoist cylinder 10 is extended out by the pressure oil in the oil chamber A, lifting up the vessel 3 to the tilted dumping position shown in FIG. 2. That is to say, at this time, both of the first and second directional control valves 20 and 21 of the control valve unit 16 are switched to the respective raising positions (b), expanding the respective hoist cylinders 10 by a hydraulic pressure force to lift the vessel 3 in an upward direction.

On the other hand, following are performances of the control valve unit 16 in a floating position. In this case, the first directional control valve 20 of the control valve unit 16 is switched to a floating position (c) from the neutral position (a), while the second directional control valve 21 is retained in the neutral position (a). As soon as the first directional control valve 20 is switched to the floating position (c), the actuator side oil passage 22A is connected to the low pressure side passage 18 and tank line 14 through the directional control valve 20. Further, the actuator side oil passage 22B is connected to the low pressure side passage 18 and tank line 14 through a check valve 24B, which will be described hereinafter, and the other actuator side oil passage 23B is connected to the low pressure side passage 18 and tank line 14 through a check valve 26B, which will also be described hereinafter.

As a consequence, each hoist cylinder 10 is contracted at a certain rate depending upon a load factor (self-weight) of the vessel 3, draining the pressure oil in the oil chamber A toward the tank 12 through the hydraulic conduit 15A, actuator side oil passage 22A and first directional control valve 20 while taking pressure oil into the oil chamber B from the tank 12 through the check valves 24B and 26B via the actuator side oil passage 22B and 23B and hydraulic conduit 15B. In this manner, at this time, the first directional control valve 20 of the control valve unit 16 is put in the floating position (c) permitting the vessel 3 to fall down by gravity.

Following are performances when the control valve unit 16 is put in a lowering position. In this case, the first directional control valve 20 of the control valve unit 16 is returned to the neutral position (a), while the second directional control valve 21 is switched to a lowering position (d) from the neutral position (a). Namely, as soon as the second directional control valve 21 is switched to the lowering position (d), pressure oil from the hydraulic pump 11 is supplied to the oil chamber B of each hoist cylinder 10 through the pump line 13, high pressure side passage 17, second directional control valve 21, actuator side oil passage 23B and hydraulic conduit 15B. In the meantime, an oil in the oil chamber A is drained to the tank 12 via the hydraulic conduit 15A, actuator side oil passage 23A, second directional control valve 21, low pressure side passage 18 and tank line 14.

As a result, the inner tube portion 10B of each hoist cylinder 10 is retracted into the outer tube portion 10A along with the piston rod 10C by pressure oil prevailing in the oil chamber B, turning the vessel 3 downward toward the transporting position of FIG. 1 by a hydraulic pressure force of the hoist cylinder 10. Namely, at this time, the second directional control valve 21 of the control valve unit 16 is switched to the lowering position (d), contracting the hoist cylinders 10 with a hydraulic pressure force to put the vessel 3 at sit down position on the vehicle body 2.

Indicated at 24A and 24B are make-up check valves which are provided on the side of the first directional control valve 20 of the control valve unit 16. These check valves 24A and 24B are located between the actuator side oil passage 22A or 22B and the low pressure side passage 18, bypassing the first directional control valve 20. Further, the check valves 24A and 24B permit an oil in the tank 12 to flow toward the oil chambers A or B of the hoist cylinders 10 from the low pressure side passage 18 through the actuator side oil passage 22A or 22B and hydraulic conduit 15A or 15B, while blocking a reverse flow of oil. Thus, oil is supplied to the oil chambers A and B of the hoist cylinders 10 to prevent development of a vacuum pressure in these oil chambers.

Indicated at 25A and 25B are relief valves which are provided in the control valve unit 16 to prevent overloading. These relief valves 25A and 25B are located between the actuator side oil passage 22A or 22B and the low pressure side passage 18 parallel with the check valves 24A and 24B, respectively, bypassing the first directional control valve 20. One relief valve 25A is opened in case an overloading takes place in the contracting direction of the hoist cylinders 10, for example, to relieve the oil chambers A of an overloading pressure. The other relief valve 25B is opened in case overloading takes place in the expanding direction of the hoist cylinders 10, for example, to relieve the oil chambers B of an overloading pressure.

Denoted at 26A and 26B are make-up check valves which are provided on the side of the second directional control valve 21 of the control valve unit 16. These check valves 26A and 26B are located between the actuator side oil passage 23A or 23B and the low pressure side passage 18, bypassing the second directional control valve 21. The check valves 26A and 26B permit oil in the tank 12 to flow toward the oil chamber A or B of the hoist cylinders 10 from the low pressure side passage 18 through the actuator side oil passage 23A or 23B and hydraulic conduit 15A or 15B, while blocking a reverse flow of oil. Thus, oil is supplied to the respective oil chambers A and B of the hoist cylinders 10.

Indicated at 27 is a relief valve which is located between the high pressure side passage 17 and the low pressure side passage 18 of the control valve unit 16. This relief valve 27 has a function of altering a relieving pressure level, namely, a function of setting a maximum output pressure of the hydraulic pump 11. An overpressure in excess of a preset maximum output pressure of the hydraulic pump 11 is relieved to the side of the tank 12 as an excess pressure. The relief valve 27 is provided with a set pressure variable portion 27A which is supplied with a pilot pressure Pb to switch a relief pressure level to a high pressure setting.

Namely, when the first and second directional control valves 20 and 21 are switched to the respective raising positions (b) by supply of a pilot pressure Pb, the relief pressure level is switched to a high pressure setting by the relief valve 27 to set the output pressure of the hydraulic pump 11 at a high output level. On the other hand, when the pilot pressure Pb is not applied, the relief pressure level is switched to a low pressure setting to limit excessive pressure of the pressure oil. Thus, the hydraulic pump 11 is operated at a low output pressure when the first and second directional control valves 20 and 21 are in positions other than the raising position (b), namely, when these directional control valves 20 and 21 are in the neutral position (a), floating position (c) or lowering position (d).

A pilot pressure is applied to the first and second directional control valves 20 and 21 in the manner as described below with reference to FIG. 4.

Indicated at 28 is a control lever assembly, i.e., a manual operating means of the control valve unit 16. For example, this control lever assembly 28 is consisted of an electric lever assembly, and the like, and provided with a control lever 28A to be manually turned by an operator within the cab 6. More particularly, the control lever 28A can be manually turned to one of switching positions corresponding to "retaining", "raising", "floating" and "lowering" positions of the control valve unit 16.

In this instance, the control lever 28A is provided with a first return position 28A1 indicated in solid line and a second return position 28A2 indicated in two-dot chain line in FIG. 4, and normally held in the first return position 28A1. In this instance, the first return position 28A1 corresponds to the retaining position for stopping and retaining the vessel 3 at an arbitrary position. When the control lever 28A is turned in the direction of arrow R from the first return position 28A1, which is indicated in solid line in FIG. 4, a pilot pressure Pb is output from a raising pilot output portion 33B of a pilot pressure generator 33, which will be described hereinafter. In this state, if an operator releases his or her hand from the control lever 28A, the control lever 28A is automatically returned to the first return position 28A1, which is indicated in solid line in FIG. 4, by the action of a return spring (not shown).

Further, when the control lever 28A in the first return position 28A1 which is indicated in solid line in FIG. 4 is turned by an operator against the action of the afore-mentioned return spring as far as the second return position 28A2 which is indicated in two-dot chain line in FIG. 4, the control lever 28A remains in that position by its self-retaining action. In this case, a pilot pressure Pc is output from a floating pilot output portion 33C, which will be described hereinafter.

Further, when the control lever 28A in the second return position 28A2 is turned in the direction of arrow L, a pilot pressure Pd is output from a lowering pilot output portion 33D, which will be described hereinafter. In this state, if the operator releases his or her hand from the control lever 28A, the control lever 28A is automatically returned to the second return position 28A2 by the action of another return spring (not shown).

Indicated at 29 is a lever sensor which is provided on the control lever assembly 28. This lever sensor 29 plays a role of detecting a current position of the control lever 28A when it is operated by an operator, outputting a corresponding detection signal to a controller 32, which will be described hereinafter. The lever sensor 29 constitutes a position detecting means according to the invention, to detect to which one of the above-described positions the control valve unit 16 is switched by way of the control lever assembly 28.

Indicated at 30 is a sit-down sensor which is provided to check out whether or not the vessel 3 is sitting down on the vehicle body 2. As shown in FIGS. 1 and 2, this sit-down sensor 30 is constituted by a contacting type sensor which is located on the side of the vehicle body 2, for example, located on top of the tank 12 to check out whether or not the vessel is in a sit-down position, by way of a projecting object 30A which is provided on the side of the vessel 3. Namely, the sit-down sensor 30 constitutes a platform condition detecting means to check out behaviors of the vessel 3 on the vehicle body 2 (to check out in what posture the vessel 3 is on the vehicle body), outputting a detection signal to a controller 32 which will be described hereinafter.

Indicated at 31 is a vehicle speed sensor as a vehicle speed detecting means which checks out whether or not the dump truck 1 is in travel. For example, as shown in FIGS. 1 and 2, the vehicle speed sensor 31 is located on the side of a rear wheel 8 to detect a travel speed of the dump truck 1 (hereinafter referred to as "a vehicle speed V") from a rotational speed of a rear wheel 8.

Indicated at 32 is a controller, which is constituted by a microcomputer or the like which is serving as a control means. Input side of the controller 32 is connected with the lever sensor 29, sit-down sensor 30 and vehicle speed sensor 31, while output side of the controller 32 is connected with a pilot pressure generator 33, which will be described hereinafter. Further, the controller 32 is provided with a memory section 32A including ROM and RAM to store a control program as in FIG. 5, along with a reference vehicle speed V0 to be used at the time of making a judgment whether the dump truck 1 is in travel or not.

Thus, jumping motions of the vessel 3 are suppressed by the controller 32 through execution of the control program of FIG. 5, which will be explained hereinafter. Namely, the controller 32 is adapted to go into an anti-jumping control for the vessel 3 on the basis of signals from the lever sensor 29, sit-down sensor 30 and vehicle speed sensor 31, by switching the control valve unit 16 from the floating position (c) to the lowering position (d) upon detection of a jumping motion of the vessel 3 on the vehicle body 2 when the vehicle (dump truck 1) is in travel with the control valve unit 16 in the floating position (c).

Indicated at 33 is a pilot pressure generator which is connected to the output side of the controller 32. As shown in FIG. 4, this pilot pressure generator 33 is adapted to convert a control signal (an electric signal) from the controller 32 to a pilot pressure Pb, Pc or Pd, and is constituted, for example, by an electro-hydraulic conversion device like an electro-hydraulic proportional valve. The pilot pressure generator 33 is composed of a retaining pilot output portion 33A, a raising pilot output portion 33B, a floating pilot output portion 33C and a lowering pilot output portion 33D.

71 Denoted at 34 is a pilot pump serving as a pilot pressure source along with the tank 12. Along with the hydraulic pump 11 of FIG. 3, the pilot pump 34 is driven from the engine 9 to supply pressure oil, for example, of the order of 0.5 to 5.0 MPa (megapascals) to the pilot pressure generator 33. By means of the pilot pressure generator 33, the pressure oil from the pilot pump 34 is output, for example, as a pilot pressure Pb, Pc or Pd.

In this instance, for example, when the control lever 28A of the control lever assembly 28 is located in the first return position 28A1 indicated in solid line in FIG. 4, a control signal is output to the retaining pilot output portion 33A of the pilot pressure generator 33 from the controller 32. At this time, in order to hold the vessel 3 in the retaining position, both of the first and second directional control valves 20 and 21 are retained in the respective neutral positions (a), and no pilot pressure Pb, Pc or Pd is output from the pilot pressure generator 33.

Further, when the control lever 28A is turned in the direction of arrow R from the first return position 28A1 indicated in solid line in FIG. 4, for example, a control signal is output to the raising pilot output portion 33B of the pilot pressure generator 33 from the controller 32. At this time, both of the first and second directional control valves 20 and 21 of the control valve unit 16 are both switched from the neutral position (a) to the raising position (b), and a pilot pressure Pb is applied to the hydraulic pilot portions 20A and 21A of the first and second directional control valves 20 and 21 from the raising pilot output portion 33B of the pilot pressure generator 33, respectively.

Further, when the control lever 28A is turned from the first return position 28A1, shown in solid line in FIG. 4, to the second return position 28A2 in two-dot chain line, the control lever 28A remains in the switched position by a self-retaining action, and a control signal is output to the floating pilot output portion 33C of the pilot pressure generator 33 from the controller 32. At this time, a pilot pressure Pc is applied to the hydraulic pilot portion 20B of the directional control valve 20 from the floating pilot output portion 33C of the pilot pressure generator 33, so that the first directional control valve 20 of the control valve unit 16 is switched from the neutral position (a) to the floating position (c). In the meantime, the second directional control valve 21 is returned to the neutral position (a) because both of the pilot pressures Pb and Pd drop to a level akin to the tank pressure.

Further, when the control lever 28A is turned in the direction of arrow L from the second return position 28A2 which is shown in two-dot chain line in FIG. 4, a control signal is output to the lowering pilot output portion 33D of the pilot pressure generator 33 from the controller 32. At this time, a pilot pressure Pd is applied to the hydraulic pilot portion 21B of the second directional control valve 21 from the lowering pilot output portion 33D of the pilot pressure generator 33, so that the second directional control valve 21 of the control valve unit 16 is switched from the neutral position (a) to the lowering position (d). In the meantime, the first directional control valve 20 is returned to the neutral position (a) because both of the pilot pressures Pb and Pc drop to a level akin to the tank pressure.

Being arranged as described above, the dump truck 1 according to the first embodiment of the invention is put in operation in the manner as follows.

In the first place, at a crushing site of a mine, for example, crushed stones or rocks 4 are loaded into the vessel 3 of the dump truck 1 by the use of a big hydraulic power shovel or the like (not shown). Then, the dump truck 1, which is loaded with a large amount of crushed stones or rocks 4 on the vessel 3, is started for a dumping site in exportation shipping facilities.

Upon arriving at a dumping site, an operator in the cab 6 manually turns the control lever 28A of the control lever assembly 28 in the direction of arrow R in FIG. 4. Whereupon, a control signal is output to the raising pilot output portion 33B of the pilot pressure generator 33, for example, from the controller 32. As a result, a pilot pressure Pb is applied to the hydraulic pilot portions 20A and 21A of the first and second directional control valves 20 and 21 from the raising pilot output portion 33B of the pilot pressure generator 33.

Thus, both of the first and second directional control vales 20 and 21 of the control valve unit 16 are switched from a neutral position (a) to a raising position (b), respectively. Therefore, pressure oil from the hydraulic pump 11 is supplied to the oil chambers A of the hoist cylinders 10 through the pump line 13, high pressure side passage 17, second directional control valve 21, actuator side oil passage 23A and hydraulic conduit 15A. Further, oil in the oil chambers B is drained to the tank 12 through the hydraulic conduit 15B, actuator side oil passage 22B, first directional control valve 20, low pressure side passage 18 and tank line 14.

As a result, the piston rod 10C of each hoist cylinder 10 is extended out by the pressure oil in the oil chamber A to lift up the vessel 3 to a dumping position, tilting up the vessel 3 in a rearward direction as shown in FIG. 2. At this time, as the vessel 3 on the dump truck 1 is pivotally turned about the connecting pin 5 to the tilted raising position of FIG. 2, the crushed rocks 4 in the vessel 3 are dropped down at the unloading spot.

At this time, as soon as the operator takes his or her hand off the control lever 28A, the control lever 28A is automatically returned to the first return position 28A1 of FIG. 4 by the action of the afore-mentioned return spring. In this case, a control signal is output to the retaining pilot output portion 33A of the pilot pressure generator 33 from the controller 32 to hold all of the pilot pressures Pb, Pc and Pd of the pilot pressure generator 33 at a level akin to the tank pressure.

As a result, the directional control valves 20 and 21 of the control valve unit 16 are automatically returned to the respective neutral positions (a) to suspend supply of pressure oil to and from the oil chambers A and B of the hoist cylinders 10, keeping each piston rod 10C in the extended state to stop the vessel 3 temporarily in the tilt-up position shown in FIG. 2.

In the next place, after dumping crushed stones 4, the operator manually turns the control lever 28A from the first return position 28A1, shown in FIG. 4, to the second return position 28A2 in two-dot chain line. Whereupon, a control signal is output to the floating pilot output portion 33C of the pilot pressure generator 33 from the controller 32, and a pilot pressure Pc is applied to the hydraulic pilot portion 20B of the first directional control valve 20 from the floating pilot output portion 33C of the pilot pressure generator 33 to switch the directional control valve 20 to the floating position (c). In the meantime, the second directional control valve 21 is automatically returned to the neutral position (a).

As soon as the first directional control valve 20 is switched to the floating position (c) in this manner, the oil chamber A of each hoist cylinder 10 is brought into communication with the low pressure side passage 18 and tank line 14 through the hydraulic conduit 15A, actuator side oil passage 22A and first directional control valve 20. On the other hand, the oil chamber B of each hoist cylinder 10 is brought into communication with the low pressure side passage 18 and tank line 14 through the hydraulic conduit 15B, actuator side oil passage 22B or 23B and check valve 24B or 26B.

As a result, each hoist cylinder 10 is contracted at a rate depending upon a load factor (self-weight) which is applied from the side of the vessel 3, discharging oil in the oil chamber A toward the tank 12 while supplying oil to the oil chamber B from the tank 12 through the check valve 24B or 26B. Thus, the hoist cylinders 10 permit the vessel 3 to fall down by self-weight and lie horizontally in the transporting position as shown in FIG. 1, sitting on the vehicle body 2.

On the other hand, in case the dump truck 1 is swayed in a tilted state on a bumpy road or on a slope of a working site, the vessel 3 may not fall down by self-weight even after the first directional control valve 20 of the control valve unit 16 has been switched to the floating position (c). However, in such a case, a control signal is output to the lowering pilot output portion 33D of the pilot pressure generator 33 of the controller 32 as soon as the control lever 28A is manually turned by an operator in the direction of arrow L from the second return position 28A2 which is shown in two-dot chain line in FIG. 4.

Thus, a pilot pressure Pd is applied to the hydraulic pilot portion 21B of the second directional control valve 21 from the lowering pilot output portion 33D of the pilot pressure generator 33 to switch the directional control valve 21 to the lowering position (d). At this time, the first directional control valve 20 is automatically returned to the neutral position (a). Accordingly, by way of the directional control valve 21 which has been switched to the lowering position (d), pressure oil from the hydraulic pump 11 is supplied to the oil chamber B of each hoist cylinder 10 through the pump line 13, high pressure side passage 17, actuator side oil passage 23B and hydraulic conduit 15B. Further, oil in the oil chamber A is returned to the tank 12 through the hydraulic conduit 15A, actuator side oil passage 23A, low pressure side passage 18 and tank line 14.

Thus, by the pressure oil prevailing in the oil chamber B, the inner tube portion 10B of each hoist cylinder 10 is retracted into the outer tube portion 10A along with the piston rod 10C, turning the vessel 3 downward toward the transporting position in FIG. 1 by hydraulic pressure forces of the respective hoist cylinders 10, forcibly letting the vessel 3 sit down on the vehicle body 2.

However, when the second directional control valve 21 of the control valve unit 16 is switched to the lowering position (d) in this manner, each hoist cylinder 10 is contracted by hydraulic pressure force, with possibilities of applying impacts or excessive loads to the vessel 3 and the vehicle body 2 when the former is sitting down on the latter.

Further, if the second directional control valve 21 is continually left in the lowering position (d), the vessel 3 is continuously pressed against the vehicle body 2 by the hydraulic pressure force of each hoist cylinder 10. That is to say, the hydraulic pressure force is constantly applied as an extra load on abutting surfaces of the vessel 3 and the vehicle body 2.

This gives rise to a problem that the service life of each hoist cylinder 10 can be shortened by the overloading pressure of the pressure oil.

Therefore, the operator of the dump truck 1 needs to switch the control lever 28A again to the second return position 28A2 in FIG. 4. Whereupon, the second directional control valve 21 is returned to the neutral position (a), while the first directional control valve 20 is switched to the floating position (c) again. As a result, the vessel 3 is allowed to sit down (lie down) on the vehicle body 2 by self-weight, and the hoist cylinders 10 are kept in a contracted state under the weight of the vessel 3 even when the dump truck 1 is in travel.

Nevertheless, it is usually the case that the dump truck 1 is shaken to a greater degree when running on a bumpy road to or from a stone crushing site of a mine. On such an occasion, in addition to up and down shaking movements caused by bumpy road surfaces, the dump truck 1 is shaken in lateral directions due to torsional deformations of the vehicle body 2. Therefore, the hoist cylinders 10, which are kept in a contracted state under the weight of the vessel 3, can be repeatedly put in expanding and contracting motions of small stroke lengths under the influence of the vertical upward and downward and lateral (rightward and leftward) shaking movements of the vehicle.

As a result, the vessel 3 which should be kept in the sitting position on the vehicle body 2 is shaken up and down and at the same time put in lateral shaking movements causing positional deviations in such a way as to encourage the shaking movements of the vessel 3 all the more, giving a considerable discomfort to the operator in the cab 6. The repeated upward and downward shaking movements of the vessel 3 on the vehicle body 2 naturally give adverse effects to nearby component parts, causing degradations particularly in durability to shorten their life spans.

Figure 5:
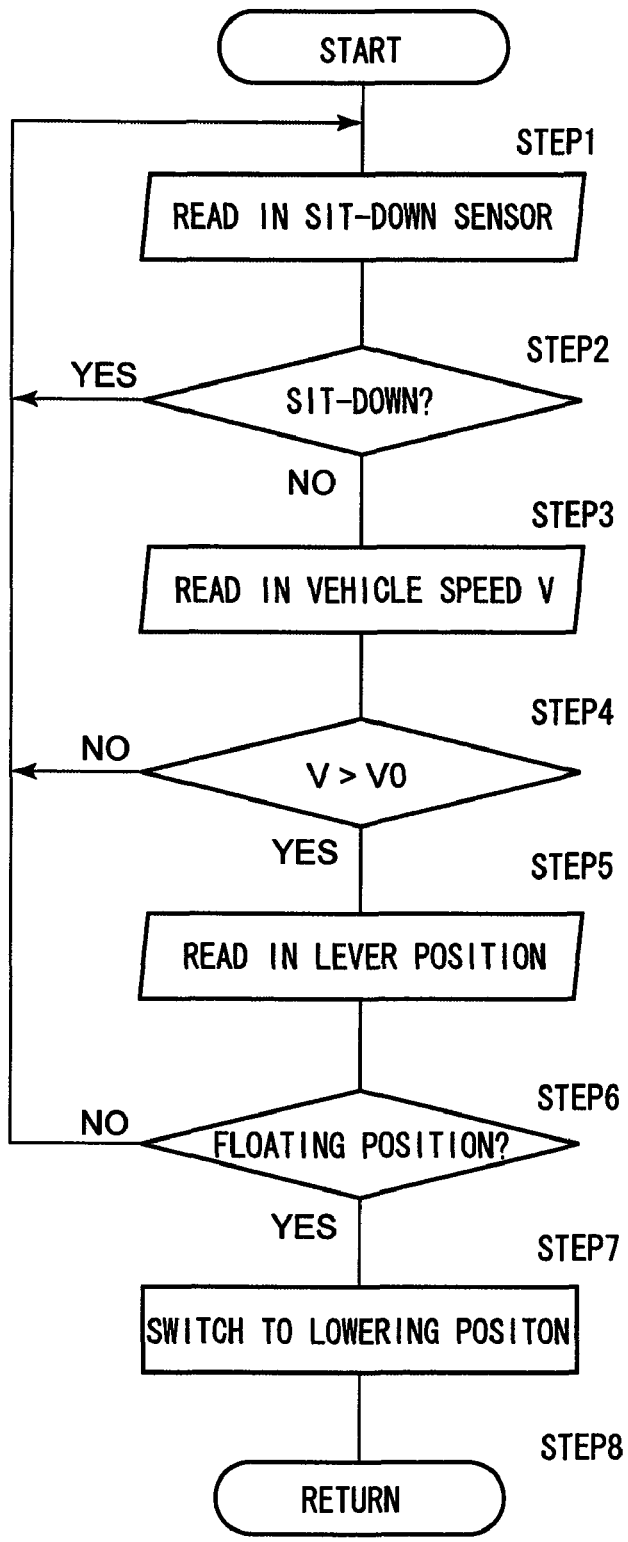
FIG. 5 is a flow chart of an anti-jumping control procedure to suppress jumping motions of the vessel carried out by a controller in the FIG. 4.

In this regard, in the first embodiment of the invention, jumping movements of the vessel 3 up and down on the vehicle body 2 are prevented or suppressed by the controller 32 while the dump truck 1 is in travel, according to the anti-jumping control of FIG. 5.

Namely, upon starting the anti-jumping control of FIG. 5, a detection signal is read in from the sit-down sensor 30 in Step 1. In next Step 2, a judgment is made as to whether or not the vessel 3 is sitting down on the vehicle body 2. If the judgment is "YES" in Step 2, it is judged that the vessel 3 is sitting down on the vehicle body 2 without a jumping motion, and for example, the control returns to Step 1.

On the other hand, if the judgment in Step 2 is "NO" in Step 2, it is likely that the vessel 3 is sitting off the vehicle body 2 and there are possibility of a jumping motion occurring. Thus, in this case, the control goes to next Step 3 to read in a current vehicle speed V of the dump truck 1 with the vehicle speed sensor 31. In next Step 4, a judgment is made as to whether or not the vehicle speed V is in excess of a reference value V0 (e.g., V0=0 km/h). If the judgment is "NO" in Step 4, it is judged that the dump truck 1 is at rest or in parking, and for example, the control goes back to repeat checkout procedures of Step 1 and onwards.

If the judgment in Step 4 is "YES", it is judged that the dump truck 1 has been started and in travel. In this case, the control goes to Step 5 to read in a position signal of the control lever 28A from the lever sensor 29. In next Step 6, a judgment is made as to whether or not the first directional control valve 20 has been switched to the floating position (c). If the judgment in Step 6 is "NO", it is judged that the first directional control valve 20 is in a position other than the floating position (c), that is to say, is in the neutral position (a) or in the raising position (b), and the control goes back to repeat checkout actions of Step 1 and onwards.

On the other hand, if the judgment in Step 6 is "YES", it is judged that the first directional control valve 20 of the control valve unit 16 is in the floating position (c), and the vessel 3 is in a floating state from the vehicle body 2 while the dump truck 1 is in travel. Therefore, in next Step 7, the first directional control valve 20 is switched from the floating position (c) to the neutral position (a), and the second directional control valve 21 is immediately switched from the neutral position (a) to the lowering position (d) to go into an anti-jumping control for the vessel 3.

Namely, upon switching the second directional control valve 21 from the neutral position (a) to the lowering position (d), the inner tube portion 10B of each hoist cylinder 10 is retracted into the outer tube portion 10A along with the piston rod 10C to contract the hoist cylinder 10 by pressure oil supplied to the oil chamber B. Therefore, the vessel 3 is turned downward toward the transporting position of FIG. 1 by hydraulic pressure forces of the hoist cylinders 10, forcibly sitting the vessel 3 down on the vehicle body 2.

Thus, by hydraulic pressure forces of the hoist cylinders 10, the vessel 3 is prevented or suppressed of jumping (floating) up and down on the vehicle body 2 when the vehicle is in travel. In case the second directional control valve 21 is switched from the neutral position (a) to the lowering position (d) in Step 7 to start an anti-jumping control for the vessel 3, the control returns in Step 8. The procedures of Steps 1 to 8 are cyclically repeated at predetermined time intervals.

Thus, according to the present embodiment of the invention, the controller 32 reads in detection signals from the lever sensor 29, sit-down sensor 30 and vehicle speed sensor 31 while checking out whether or not the first directional control valve 20 of the control valve unit 16 has been switched to the floating position (c). When it is judged that there are possibility that the vessel 3 is likely to be jumping up and down on the vehicle body 2 when the dump truck 1 is in travel, a control signal is output from the controller 32 to switch the first directional control valve 20 from the floating position (c) to the neutral position (a) immediately, while switching the second directional control valve 21 to the lowering position (d).

Accordingly, pressure oil from the hydraulic pump 11 can be supplied to the oil chamber B of each hoist cylinder 10 through the pump line 13, high pressure side passage 17, second directional control valve 21 now switched to the lowering position (d), actuator side oil passage 23B and hydraulic conduit 15B. On the other hand, oil in the oil chamber A is returned to the tank 12 through the hydraulic conduit 15A, actuator side oil passage 23A, second directional control valve 21, low pressure side passage 18 and tank line 14. Thus, each one of the hoist cylinders 10 can be held in a contracted state by a hydraulic pressure force to keep the vessel 3 in a sit-down position on the vehicle body 2.

As described above, according to the first embodiment of the invention, by means of the hoist cylinders 10, the vessel 3 which should be sitting down on the vehicle body 2 while the vehicle is in travel is restrained of up and down jumping movements as well as deviational shaky movements in lateral directions, solving the problem of shaky vessel movements giving a considerable discomfort to the operator in the cab 6.

Further, the suppression of vibrations and jumping motions of the vessel 3 on the vehicle body 2 contributes to protect nearby component parts (e.g., the connecting pin 5, abutting portions of the vehicle body 2 and the vessel 3 and sliding portions of the hoist cylinders 10 which are shown in FIG. 1) from vibrations, prolonging durability and life spans of these component parts and enhancing the reliability of the dump truck 1 (transporter vehicle) all the more.

Further, in the first embodiment, the control valve unit 16 is constituted by a combination of the first and second directional control valves 20 and 21. Therefore, in contrast to the prior art using a four-position directional control valve of complicate construction, the control valve unit 16 can be constructed by the use of the combination of 3-position directional control valves 20 and 21 which are in general use.

Besides, the control valve unit 16 can be easily constructed by the use of the first and second directional control valves 20 and 21 of the sort which is in general use, namely, simply connecting the first and second directional control valves 20 and 21 in parallel between the hydraulic pump 11, tank 12 and each one of the hoist cylinders 10.

Now, turning to FIGS. 6 through 9, there is shown a second embodiment of the present invention. This second embodiment has a feature in that a platform condition detecting means which watches movements and postures of a load carrier vessel on the vehicle is constituted by an angle sensor adapted to detect a tilt angle of the loading platform relative to a vehicle body. In the following description of the second embodiment, those component parts which are identical with a counterpart in the foregoing first embodiment are simply designated by the same reference numeral or character to avoid repetitions of similar explanations.

Figure 6:
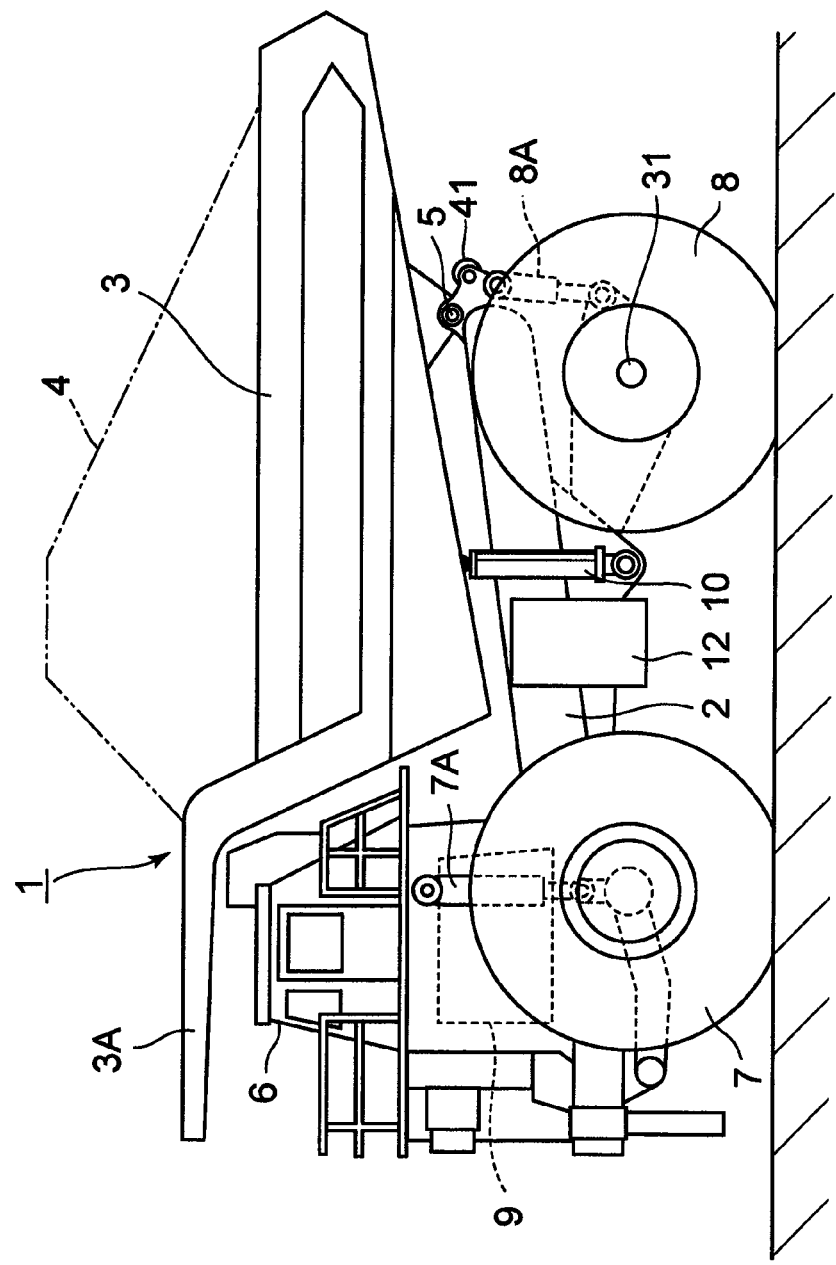
FIG. 6 is a front view illustrating a dump truck according to a second embodiment of the present invention.
Figure 7:
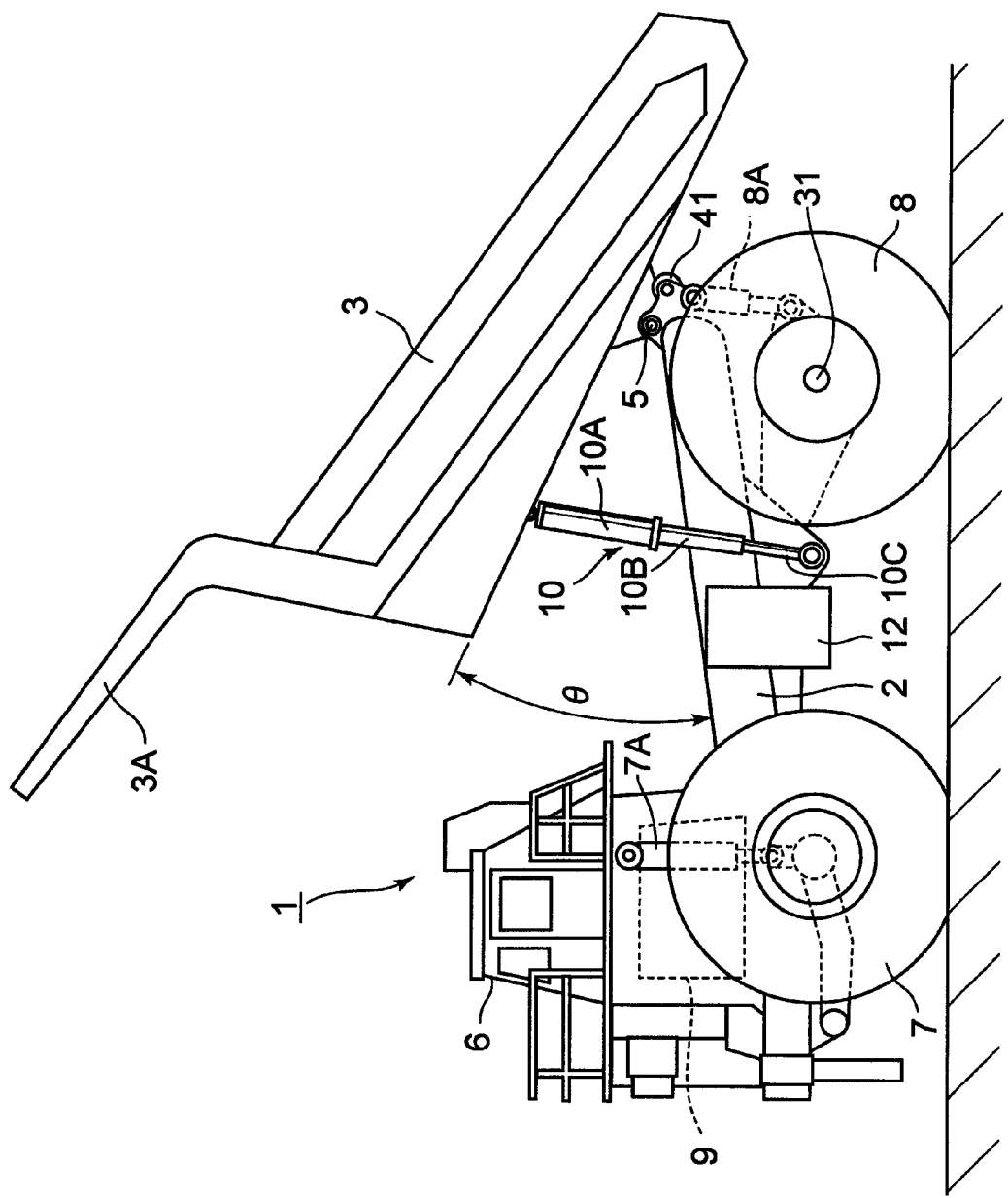
FIG. 7 is a front view illustrating a state in which a vessel in FIG. 6 is tilted up diagonally backward to a dumping position.

In the drawings, indicated at 41 is an angle sensor which constitutes a platform condition detecting means. As shown in FIGS. 6 and 7, the angle sensor 41 is attached to the rear of a vehicle body 2 in the vicinity of a connecting pin 5. The angle sensor 41 is adapted to output a signal of tilt angle of the vessel 3 relative to the vehicle body 2, i.e., a tilt angle $\theta$ as exemplified in FIG. 7, and output a corresponding detection signal to a controller 42, which will be described hereinafter.

Figure 8:
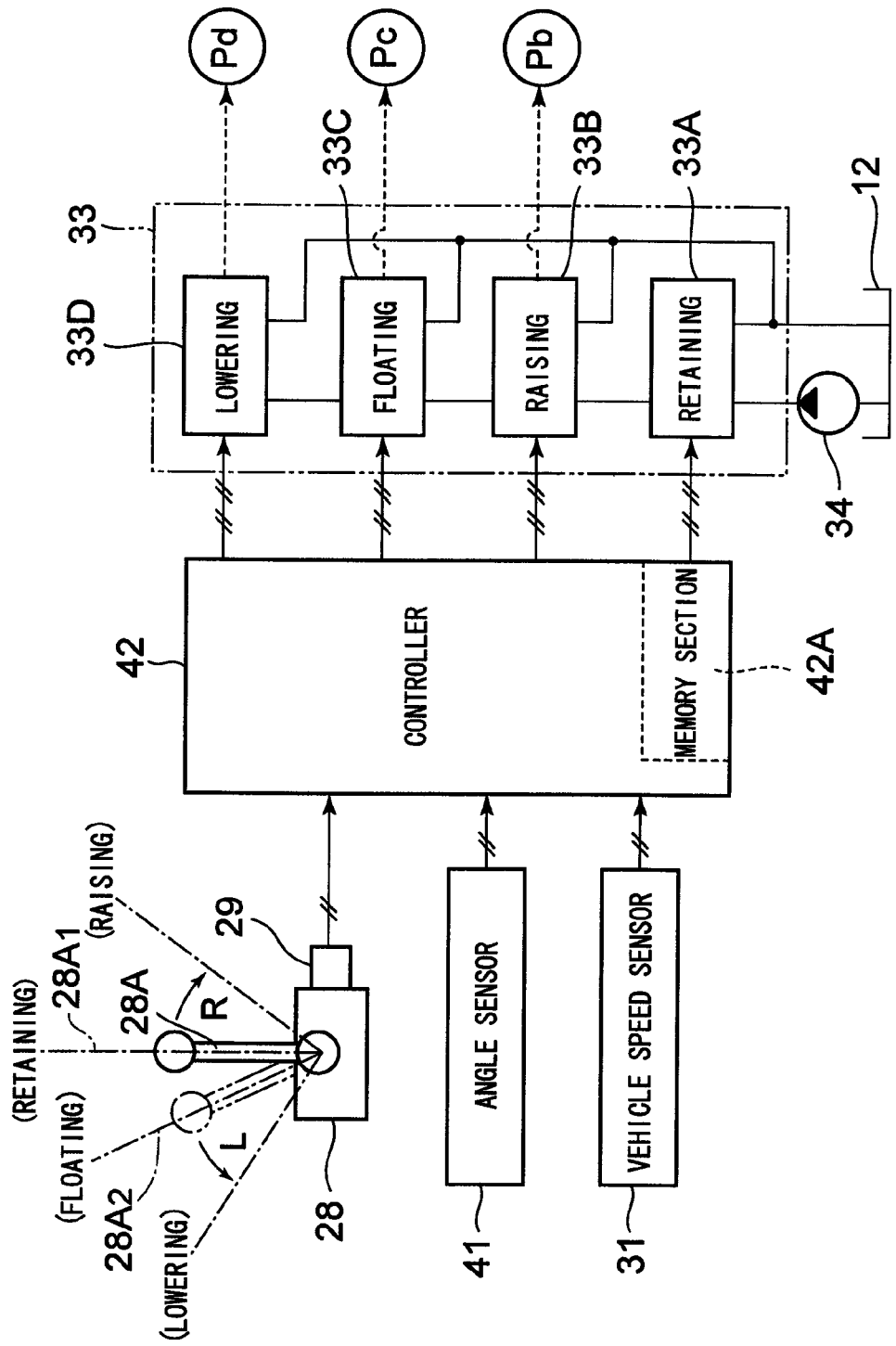
FIG. 8 is a block diagram of a control system for supplying pilot pressures to respective directional control valves of a control valve unit.

Indicated at 42 is a controller served as a control means which is constituted by a microcomputer. The controller 42 is substantially of the same build as the controller 32 in the foregoing first embodiment. However, the controller 42 differs from the counterpart in the first embodiment in that the angle sensor 41 is connected to its input side in addition to a lever sensor 29 and a vehicle speed sensor 31 as shown in FIG. 8. In a memory section 42A of the controller 42, a control program of FIG. 9 is stored along with a reference vehicle speed $V0$ and a reference vessel angle $\theta a$ to be used in judging the vessel angle $\theta$ of the vessel 3, which will be described hereinafter.

Figure 9:
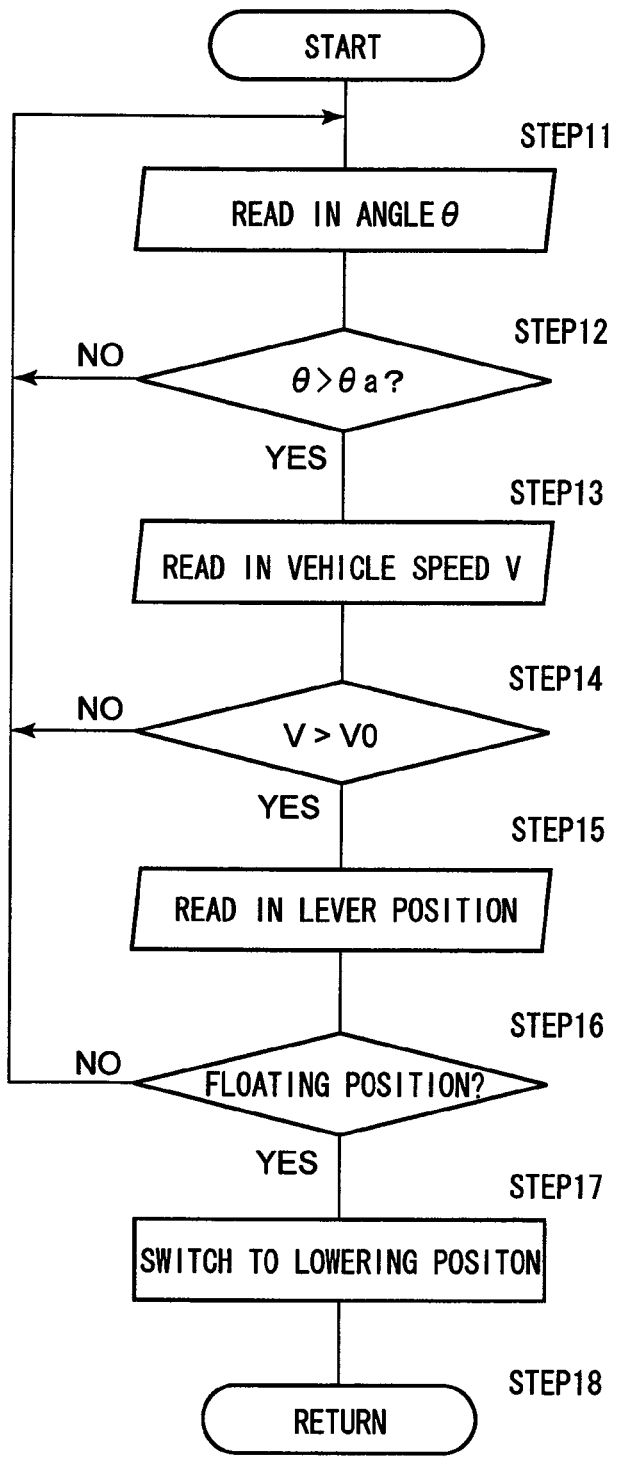
FIG. 9 is a flow chart of an anti-jumping control procedure to suppress jumping motions of the vessel carried out by a controller in the FIG. 8.

In the case of the second embodiment, jumping motions of the vessel 3 are prevented or suppressed by the controller 42 according to the anti-jumping control of FIG. 9.

Namely, an anti-jumping control procedure is started with reading in a tilt angle (angle $\theta$) of the vessel 3 from the angle sensor 41 in Step 11. In next Step 12, a judgment is made as to whether or not the angle $\theta$ of the vessel 3 is larger than the predetermined reference angle $\theta a$, namely, whether or not the vessel 3 is sitting down on the vehicle body 2. In case the judgment in Step 12 is "NO", it is judged that the vessel 3 is sitting down on the vehicle body 2 and is not in a jumping motion, and the control goes back to repeat Step 11.

On the other hand, in case the judgment in Step 12 is "YES", it is judged that the vessel 3 is seated off the vehicle body 2 and there are possibility of a jumping motion occurring, and the control proceeds to next Step 13 to read in a vehicle speed V of the dump truck 1 from the vehicle speed sensor 31. In Steps 14 to 17, the same control procedures are carried out as in Steps 4 to 7 of the first embodiment in FIG. 5.

Thus, in the second embodiment as described above, on the basis of detection signals which are read in from the lever sensor 29, vehicle speed sensor 31 and angle sensor 41 and a judgment as to whether or not the first directional control valve 20 is switched to the floating position (c), the controller 42 switches the first directional control valve 20 from the floating position (c) to the neutral position (a) and at the same time switches the second directional control valve 21 from the neutral position (a) to the lowering position (d) only when it is judged that the vessel 3 is afloat upward of the vehicle body 2 while the dump truck 1 is in travel, thereby preventing or suppressing jumping motions of the vessel 3 substantially in the same way as in the foregoing first embodiment.

Especially in the case of the second embodiment, a floating state of the vessel 3 can be detected with high accuracy by checking for the angle θ of the vessel 3 against the vehicle body 2 weather it became bigger than a predetermined reference angle θ or not. Besides, in a case where the dump truck 1 is already equipped with an angle sensor for detection of an angle of the vessel 3, that angle sensor can be utilized advantageously for the anti-jumping control.

Figure 10:
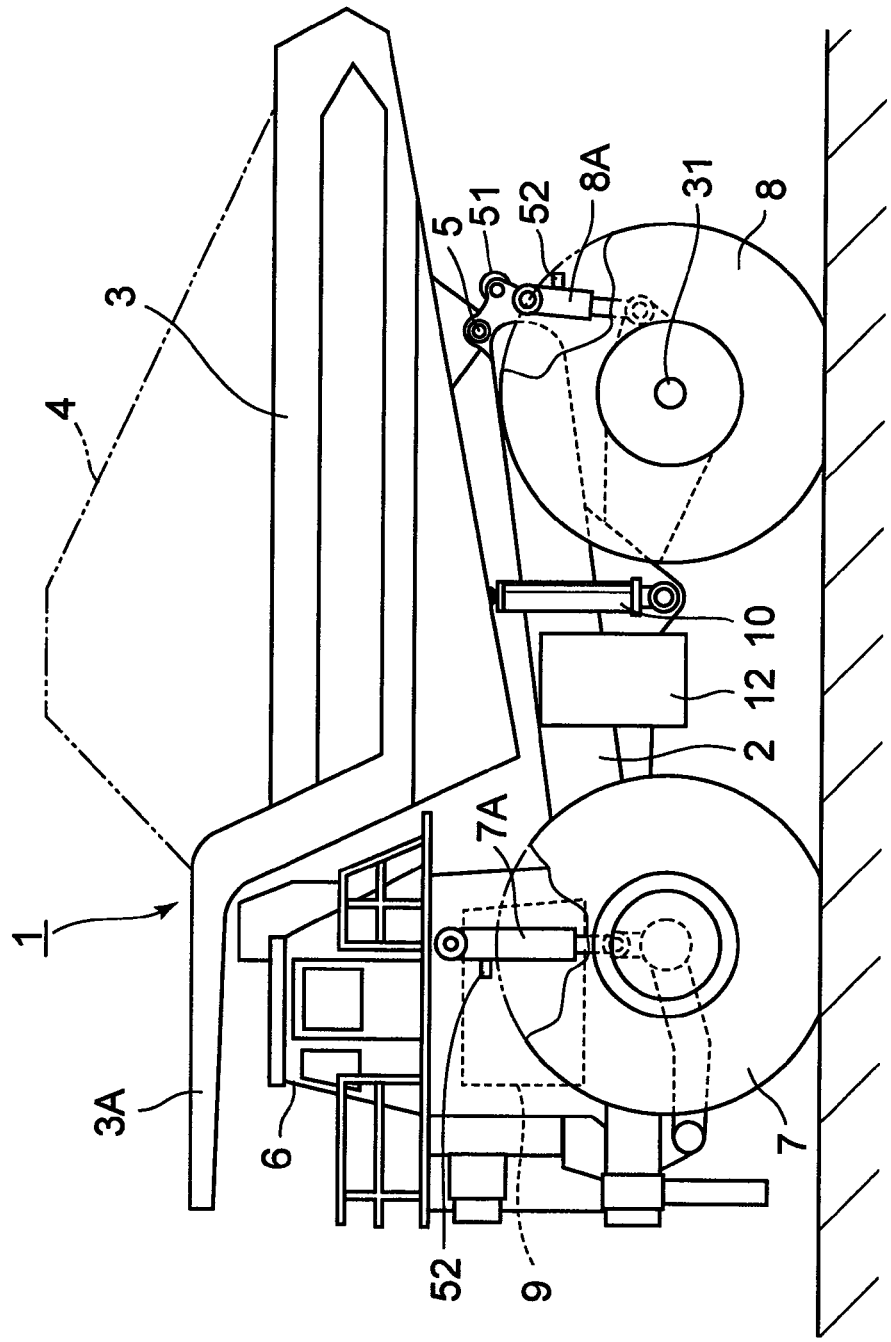
FIG. 10 is a front view illustrating a dump truck according to a third embodiment of the present invention.
Figure 11:
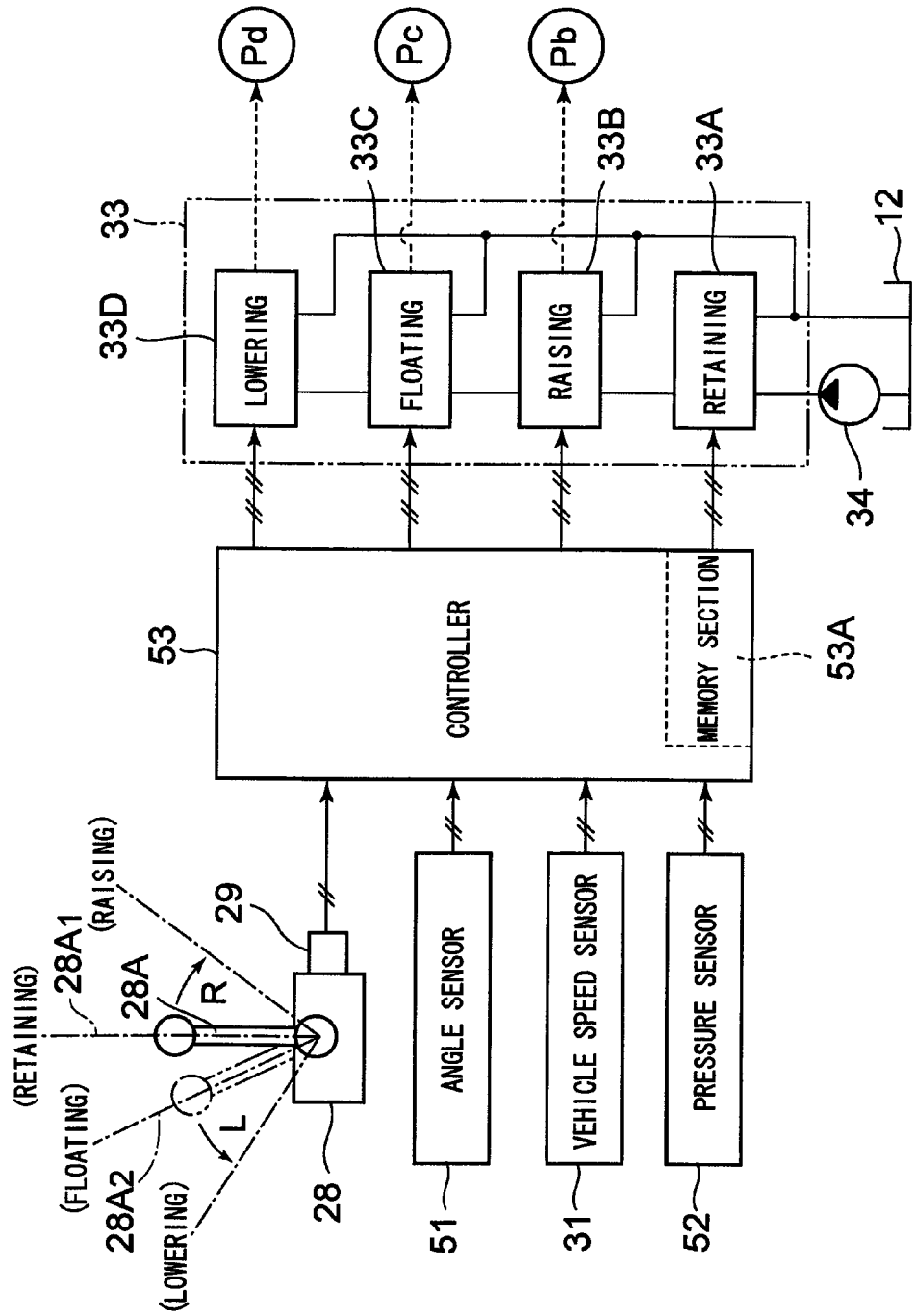
FIG. 11 is a block diagram of a control system for supplying pilot pressures to respective directional control valves of the control valve unit.
Figure 12:
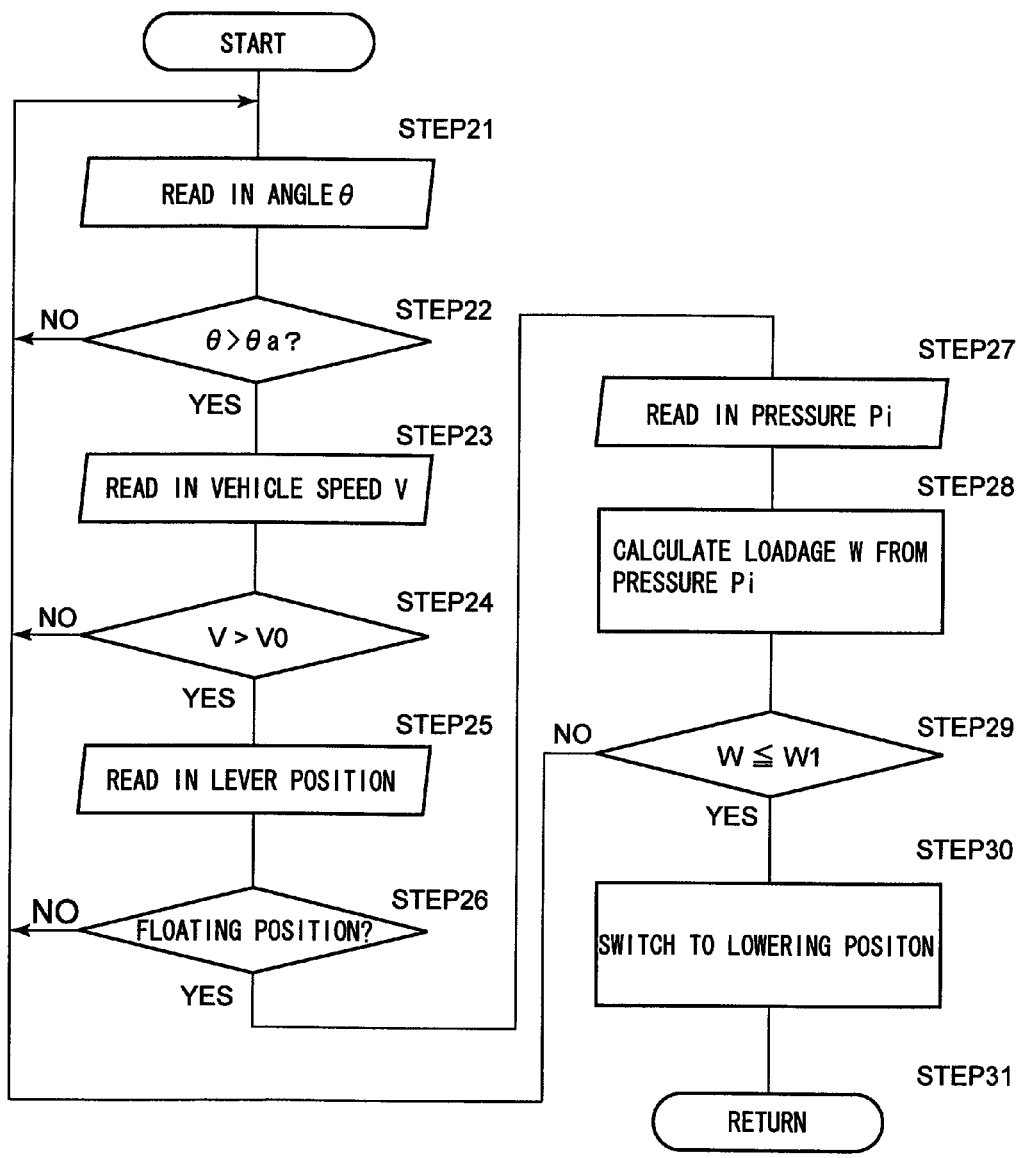
FIG. 12 is a flow chart of an anti-jumping control procedure to suppress jumping motions of the vessel carried out by a controller in the FIG. 11.

Now, turning to FIGS. 10 to 12, there is shown a third embodiment of the present invention. This third embodiment has a feature in that it is adapted to conduct a control of a loading platform, further taking into consideration a loadage factor of the vehicle body. In the following description of the third embodiment, those component parts which are identical with a counterpart in the foregoing first embodiment are simply designated by the same reference numeral or character to avoid repetitions of similar explanations.

In the drawings, indicated at 51 is an angle sensor employed as a platform condition detecting means. This angle sensor 51 is substantially of the same build as the angle sensor 41 in the foregoing second embodiment, and mounted to the rear of the vehicle body 2 at a position in the vicinity of a connecting pin 5. The angle sensor 51 is adapted to detect a tilt angle of the vessel 3 relative to the vehicle body 2, i.e., a tilt angle θ as exemplified in FIG. 7, and output a corresponding detection signal to a controller 53, which will be described hereinafter.

Indicated at 52 are pressure sensors (only two pressure sensors is shown in FIG. 10) which are provided on a front wheel side suspension 7A and rear wheel side suspension 8A, respectively, to serve as a weight detecting means. These pressure sensors 52 are adapted to detect inner pressures Pi of hydraulic dampers of the front and rear wheel side suspensions 7A and 8A and output detection signals to the controller 53.

In this instance, the inner pressures Pi of the respective suspensions 7A and 8A vary depending upon loadage W of the dump truck 1 (see FIG. 12, for example), which can be determined, for example, by calculation of a mean value of the inner pressure Pi on the side of the front wheels 7 and the inner pressure Pi on the side of the rear wheels 8.

Indicated at 53 is a controller, e.g., a microcomputer which is adopted as a control means. This controller 53 is substantially of the same build as the controller 32 in the foregoing first embodiment. However, the controller 53 differs from the counterpart of the first embodiment in that an angle sensor 51 and a pressure sensor 52 are connected to its input side in addition to a lever sensor 29 and a vehicle speed sensor 31, as shown in FIG. 8.

Further, in a memory section 53A of the controller 53, a control program of FIG. 12 is stored along with reference values such as V0 to be used in checking out a vehicle speed, a reference value θa to be used in checking for a vessel tilt angle θ of the vessel 3, and a reference value W1 to be used in checking for a loadage W of the vessel 3. The controller 53 also has a function of computing a current loadage W of the dump truck 1 from inner pressures Pi detected by each pressure sensor 52.

In this case of the third embodiment, jumping motions of the vessel 3 are prevented or suppressed by the controller 53 according to the control program of FIG. 12.

Namely, a control is started with reading in a tilt angle of the vessel 3 (an angle θ) from the angle sensor 51 in Step 21. In next Step 22, a judgment is made as to whether or not the angle θ of the vessel 3 is greater than a predetermined reference value θa, namely, whether or not the vessel 3 is sitting down on the vehicle body 2. In case the judgment in Step 22 is "NO", it is judged that the vessel 3 is sitting on the vehicle body 2 and jumping motion had not occurred, and the control goes back to repeat Step 21.

On the other hand, in case the judgment in Step 22 is "YES", it is judged that the vessel 3 is seated off the vehicle body 2 and there are possibility of jumping motion occurring, the control goes to next Step 23 to read in a vehicle speed V of the dump truck 1 from the vehicle speed sensor 31. Then, in succeeding Steps 24 to 26, vehicle conditions are checked out in the same way as in Steps 4 to 6 of the first embodiment.

In case the judgment in Step 26 is "YES", the control goes to Step 27 to read in inner pressures Pi of the pressure sensors 52 of the front and rear wheels 7 and 8, computing in next Step 28 a current loadage W of the dump truck 1 from the read-in inner pressures Pi.

Then, in Step 29, a judgment is made as to whether or not the loadage W is smaller than a predetermined reference value W1 (e.g., 100 tons), namely, whether or not the detected loadage W is smaller than the reference value W1. In case the judgment in Step 29 is "NO", it is judged that the vessel 3 is loaded with a large amount of crushed stones 4, for example, which makes loadage W larger and has no possibility of the vessel 3 floating up by a jumping motion off the vehicle body 2. Therefore, in this case, the operation returns to the control procedures in Step 21 and onwards, leaving the first directional control valve 20 of the control valve unit 16 in the floating position (c) even if the vehicle is in travel.

On the other hand, in case the judgment in Step 29 is "YES", it is judged that the first directional control valve 20 is in the floating position (c) and the vessel 3 of a light or zero loadage is floating up by a jumping motion off the vehicle body 2 while the dump truck 1 is in travel.

Therefore, in next Step 30, the first directional control valve 20 of the control valve unit 16 is switched from the floating position (c) to the neutral position (a), along with the second directional control valve 21 is forcibly switched from the neutral position (a) to the lowering position (d) to prevent jumping motions of the vessel 3. After this, the control is returned in Step 31 to repeat the procedures of Steps 21 to 31 at predetermined time intervals.

Thus, according to the present embodiment, on the basis of detection signals which are read in from the lever sensor 29, vehicle speed sensor 31, angle sensor 51 and pressure sensor 52, in addition to a lever position signal indicating that the first directional control valve 20 is switched to the floating position (c), the controller 42 goes into an anti-jumping mode to prevent jumping motions of the vessel 3 by switching the control valve unit 16 from the floating portion (c) to the lowering position (d) only when the vessel 3 of a light or zero loadage is floating up by a jumping motion off the vehicle body 2 while the dump truck 1 is in travel, thus producing substantially the same operational effects as in the foregoing first embodiment.

Especially in the case of the third embodiment, when the vessel 3 is found to be carrying no load of transportation like crushed stones 4, for example, and when the dump truck 1 is in travel, switching the control valve unit 16 from the floating position (c) to the lowering position (d) to prevent jumping motions of the vessel 3 on the vehicle body 2. In case the vessel 3 is found to be carrying a large amount of crushed stones 4 and incapable of jumping motions of the vessel 3 on the vehicle body 2 under the weight of the carrying load, the first directional control valve 20 of the control valve unit 16 is left in the floating position (c) even if the vehicle is found to be in travel, keeping the hoist cylinders 10 free of hydraulic pressures which would otherwise act thereon as extra loads.

Further, while monitoring the variation of inner pressures of front and rear wheel side suspensions 7A and 8A by the pressure sensors 52, a current loadage W of the dump truck 1 is calculated on the basis detection signals. That is to say, a current loadage W can be easily detected through utilization of existing suspensions 7A and 8A, to which the pressure sensors 52 can be attached easily.

In the third embodiment, a judgment as to whether or not the vessel 3 is sitting down on the vehicle body 2 is made through detection of an angle θ of the vessel 3 by the angle sensor 51. However, the present invention is not limited to this particular example. For instance, the sit-down sensor 30 in the foregoing first embodiment may be employed for checking out the position or posture of the vessel 3 on the vehicle body 2, whether the vessel 3 is sitting on the vehicle body 2 or not.

Further, in each one of the above-described embodiments, by way of example the control valve unit 16 is composed of a pair of first and second directional control valves 20 and 21. However, the present invention is not limited to this particular example. For instance, if desired, the control valve unit may be constituted by a 4-position directional control valve of the sort as described in Japanese Patent Laid-Open No. 2001-105954.

Further, in the foregoing embodiments, the present invention is described in relation with a dump truck 1 with front and rear wheels 7 and 8 which vessel 3 are supported on a wheel type vehicle body 2. Needless to say, the present invention can be similarly applied to other transporter vehicles, for example, to a transporter vehicle having a vessel as a loading platform mounted on a crawler type vehicle body.

The invention claimed is:

1. A transporter vehicle, comprised of:
an automotive vehicle body (2), a loading platform (3) tiltably mounted on said vehicle body (2) to carry a load of transportation, an expandable hoist cylinder (10) connected between said loading platform (3) and said vehicle body (2) to lift said loading platform (3) up to a rearwardly tilted position at a time of dumping said load of transportation from said loading platform (3), a hydraulic pressure source (11, 12) for supplying and discharging pressure oil to and from said hoist cylinder (10) to elongate and contract said hoist cylinder (10), and a control valve unit (16) connected between said hydraulic pressure source (11, 12) and said hoist cylinder (10) to control supply and discharge of pressure oil to and from said hoist cylinder (10);
said control valve unit (16) being switchable to and from a plural number of positions, including a raising position (b) for raising said loading platform (3) by extending said hoist cylinder (10) by supplying and discharging said pressure oil, a lowering position (d) for lowering said loading platform (3) downward by contracting said hoist cylinder (10) by supplying and discharging said pressure oil, a floating position (c) for allowing a self-weight fall of said loading platform (3) by contracting said hoist cylinder (10) by the self-weight of said loading platform (3), and a neutral position (a) for stopping a movement of said hoist cylinder (10) by stopping the supply and discharge of said pressure oil;
characterized in that said transporter vehicle further comprises:
a position detecting means (29) adapted to detect to which one of said positions (a) to (d) said control valve unit (16) is currently shifted;
a platform condition detecting means (30, 41, 51) adapted to detect a current posture of said loading platform (3) on said vehicle body (2);
a vehicle speed detecting means (31) adapted to detect whether or not said vehicle body (2) is current in travel; and
a control means (32, 42, 53) adapted to switch said control valve unit (16) from said floating position (c) to said lowering position (d) when it is judged that said control valve unit (16) is currently in said floating position (c), that said loading platform (3) floated up from said vehicle body (2) and that said vehicle body (2) is currently in travel, on the basis of detection signals from said position detecting means (29), platform condition detecting means (30, 41, 51) and vehicle speed detecting means (31).

2. A transporter vehicle as defined in claim 1, further comprising a weight detecting means (52) adapted to detect a current loadage (W) of said vehicle body (2);
said control means (32, 42, 53) being adapted to switch said control valve unit (16) from said floating position (c) to said lowering position (d) when it is judged that said control valve unit (16) is currently in said floating position (c), that said loading platform (3) is floated up from said vehicle body (2), that said vehicle body (2) is currently in travel and that a current loadage (W) is smaller than a predetermined reference value (W1), on the basis of a detection signal from said weight detecting means (52) in addition to detection signals from said position detecting means (29), platform condition detecting means (30, 41, 51), and vehicle speed detecting means (31).

3. A transporter vehicle as defined in claim 2, further comprising suspensions (7A, 8A) between said vehicle body (2) and vehicle wheels (7, 8); and
said weight detecting means being constituted by pressure sensors (52) adapted to detect variations in inner pressure of said suspensions (7A, 8A).

4. A transporter vehicle as defined in claim 1, wherein said platform condition detecting means is constituted by a sit-down sensor (30) adapted to detect whether or not said loading platform (3) is sitting down on said vehicle body (2).

5. A transporter vehicle as defined in claim 1, wherein said platform condition detecting means is constituted by an angle sensor (41, 51) adapted to detect a tilt angle (8) of said loading platform (2) relative to said vehicle body (3).

6. A transporter vehicle as defined in claim 1, wherein said control valve unit (16) is composed of a combination of a first directional control valve (20) switchable to either a neutral position (a) for suspending supply and discharge of pressure oil to and from said hoist cylinder (10) or to either one of said raising position (b) and floating position (c), and a second directional control valve (21) switchable to a neutral position (a) for suspending supply and discharge of pressure oil to and from said hoist cylinder (10) or to either one of said raising position (b) and lowering position (d).

7. A transporter vehicle as defined in claim 1, wherein said control valve unit (16) is composed of first and second directional control valves (20, 21) connected in parallel between said hydraulic pressure source (11, 12) and said hoist cylinder (10), said first directional control valve (20) being switchable to a neutral position (a) for suspending supply and discharge of pressure oil to and from said hoist cylinder (10) or to either one of said raising position (b) and floating position (c), and said second directional control valve (21) being switchable to a neutral position (a) for suspending supply and discharge of pressure oil to and from said hoist cylinder (10) or either one of said raising position (b) and lowering position (d).

8. A transporter vehicle as defined in claim 2, wherein said control valve unit (16) is composed of a combination of a first directional control valve (20) switchable to either a neutral position (a) for suspending supply and discharge of pressure oil to and from said hoist cylinder (10) or to either one of said raising position (b) and floating position (c), and a second directional control valve (21) switchable to a neutral position (a) for suspending supply and discharge of pressure oil to and from said hoist cylinder (10) or to either one of said raising position (b) and lowering position (d).

9. A transporter vehicle as defined in claim 3, wherein said control valve unit (16) is composed of a combination of a first directional control valve (20) switchable to either a neutral position (a) for suspending supply and discharge of pressure oil to and from said hoist cylinder (10) or to either one of said raising position (b) and floating position (c), and a second directional control valve (21) switchable to a neutral position (a) for suspending supply and discharge of pressure oil to and from said hoist cylinder (10) or to either one of said raising position (b) and lowering position (d).

10. A transporter vehicle as defined in claim 4, wherein said control valve unit (16) is composed of a combination of a first directional control valve (20) switchable to either a neutral position (a) for suspending supply and discharge of pressure oil to and from said hoist cylinder (10) or to either one of said raising position (b) and floating position (c), and a second directional control valve (21) switchable to a neutral position (a) for suspending supply and discharge of pressure oil to and from said hoist cylinder (10) or to either one of said raising position (b) and lowering position (d).

11. A transporter vehicle as defined in claim 5, wherein said control valve unit (16) is composed of a combination of a first directional control valve (20) switchable to either a neutral position (a) for suspending supply and discharge of pressure oil to and from said hoist cylinder (10) or to either one of said raising position (b) and floating position (c), and a second directional control valve (21) switchable to a neutral position (a) for suspending supply and discharge of pressure oil to and from said hoist cylinder (10) or to either one of said raising position (b) and lowering position (d).

12. A transporter vehicle as defined in claim 2, wherein said control valve unit (16) is composed of first and second directional control valves (20, 21) connected in parallel between said hydraulic pressure source (11, 12) and said hoist cylinder (10), said first directional control valve (20) being switchable to a neutral position (a) for suspending supply and discharge of pressure oil to and from said hoist cylinder (10) or to either one of said raising position (b) and floating position (c), and said second directional control valve (21) being switchable to a neutral position (a) for suspending supply and discharge of pressure oil to and from said hoist cylinder (10) or either one of said raising position (b) and lowering position (d).

13. A transporter vehicle as defined in claim 3, wherein said control valve unit (16) is composed of first and second directional control valves (20, 21) connected in parallel between said hydraulic pressure source (11, 12) and said hoist cylinder (10), said first directional control valve (20) being switchable to a neutral position (a) for suspending supply and discharge of pressure oil to and from said hoist cylinder (10) or to either one of said raising position (b) and floating position (c), and said second directional control valve (21) being switchable to a neutral position (a) for suspending supply and discharge of pressure oil to and from said hoist cylinder (10) or either one of said raising position (b) and lowering position (d).

14. A transporter vehicle as defined in claim 4, wherein said control valve unit (16) is composed of first and second directional control valves (20, 21) connected in parallel between said hydraulic pressure source (11, 12) and said hoist cylinder (10), said first directional control valve (20) being switchable to a neutral position (a) for suspending supply and discharge of pressure oil to and from said hoist cylinder (10) or to either one of said raising position (b) and floating position (c), and said second directional control valve (21) being switchable to a neutral position (a) for suspending supply and discharge of pressure oil to and from said hoist cylinder (10) or either one of said raising position (b) and lowering position (d).

15. A transporter vehicle as defined in claim 5, wherein said control valve unit (16) is composed of first and second directional control valves (20, 21) connected in parallel between said hydraulic pressure source (11, 12) and said hoist cylinder (10), said first directional control valve (20) being switchable to a neutral position (a) for suspending supply and discharge of pressure oil to and from said hoist cylinder (10) or to either one of said raising position (b) and floating position (c), and said second directional control valve (21) being switchable to a neutral position (a) for suspending supply and discharge of pressure oil to and from said hoist cylinder (10) or either one of said raising position (b) and lowering position (d).

\* \* \* \* \*